US006987260B2

(12) United States Patent
Yoshida et al.

(10) Patent No.: US 6,987,260 B2
(45) Date of Patent: Jan. 17, 2006

(54) PHOTOELECTRIC SENSOR AND DETECTOR TERMINAL MODULE THEREFOR

(75) Inventors: Hiroshi Yoshida, Fukuchiyama (JP); Masahiko Shibayama, Fukuchiyama (JP); Shoichi Konishi, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/078,826

(22) Filed: Mar. 11, 2005

(65) Prior Publication Data

US 2005/0199786 A1    Sep. 15, 2005

(30) Foreign Application Priority Data

Mar. 15, 2004 (JP) ............................ 2004-072403
Feb. 18, 2005 (JP) ............................ 2005-042078

(51) Int. Cl.
    *H01J 40/14*    (2006.01)
(52) U.S. Cl. .................. 250/214 R; 250/221; 340/635
(58) Field of Classification Search ............ 250/214 R, 250/221; 340/635
    See application file for complete search history.

(56) References Cited

U.S. PATENT DOCUMENTS 6,756,577 B2 *   6/2004   Nakanishi et al. ...... 250/214 R

* cited by examiner

Primary Examiner—Kevin Pyo
(74) Attorney, Agent, or Firm—Beyer Weaver & Thomas LLP

(57) ABSTRACT

A module from which photoelectric sensors of different types with different functions can be constructed is integrally formed with an optical assembly and a detection circuit assembly. The optical includes a lens and its holder and the detection circuit assembly and includes an integrated circuit and terminals connected to it. The integrated circuits include different circuits with various functions such as a detection circuit for detecting presence or absence of a target object of detection. The terminals include input and output terminals for passing signals to and from selected ones of these circuits depending on the desired functions of the photoelectric sensor to be formed by using the module.

17 Claims, 16 Drawing Sheets

PHOTOELECTRIC SENSOR AND DETECTOR TERMINAL MODULE THEREFOR

Priority is claimed on Japanese Patent Applications P2004-072403 filed Mar. 15, 2004 and P2005-042078 filed Feb. 18, 2005.

BACKGROUND OF THE INVENTION

This invention relates to photoelectric sensors and detector terminal modules therefor.

Photoelectric sensors of the reflective and transmissive types are known and the reflective type includes the diffuse, recursion and distance-settable types. As for their external shape, various types are known such as columnar and cylindrical shapes.

As an example of prior art photoelectric sensors of the reflective type, Japanese Patent Publication Tokkai 2000-322989 disclosed a sensor comprised of a printed circuit board, a module with a photoelectric function and a case for holding them, the printed circuit board being provided with necessary electronic circuits such as a signal processor circuit, display lamps and cables connecting to an external power source and the module including a package with an LED chip serving as a light-emitting element and a photo IC serving as a light-receiving element set in a three-dimensional circuit component formed by extrusion molding and an optical lens.

When a conventional photoelectric sensor is produced, it is necessary to design the positioning of its optical lens and the printed circuit board individually according to its external shape suited to its purpose of use. Thus, if the external shape or the sensor function is to be changed, it is necessary to redesign the sensor from the beginning.

Moreover, since many different kinds of photoelectric sensors are being mass-produced, there are many individually designed components to be managed, and this tends to increase the cost of developing sensors of a new type. There has therefore been a demand for simplifying the design such that the cost of developing a new type of photoelectric sensor will be reduced.

SUMMARY OF THE INVENTION

It is therefore an object of this invention in view of the above to provide a multi-purpose detector terminal module applicable to many types of photoelectric sensors.

It is another object of this invention to provide a photoelectric sensor of which the sensor function can be easily modified.

Other objects and effects of this invention will become apparent to a person skilled in the art by referencing the disclosure that follows.

A detection terminal module for a photoelectric sensor according to this invention may be characterized as comprising an optical assembly including a lens and a holder which holds the lens and a detection circuit assembly which is integrally formed with the optical assembly and includes an integrated circuit and terminals connected to the integrated circuit. In the above, the integrated circuit includes a detection circuit for detecting presence or absence of a target object of detection for the photoelectric sensor from a light-reception signal obtained by converting light received through the lens into an electrical signal by a light receiving element, a self-analysis circuit for judging the signal level of the light-reception signal by comparing the signal level of the light-reception signal with a specified threshold value, and a judging circuit for judging presence or absence of light entering the light receiving element or operating condition of the photoelectric sensor inclusive of result of judging by the self-analysis circuit. The terminals includes a control output terminal for transmitting outputs of the detection circuit, a stability display terminal for transmitting outputs of the self-analysis circuit, an indicator terminal for transmitting outputs of the judging circuit, a sensor power source terminal for supplying power for the integrated circuit, and a GND terminal for keeping the integrated circuit at the zero voltage level. The module of the invention serves to form sensor products of different kinds by connecting electrically through its terminal to an output circuit provided external to the detection circuit assembly. Thus, the production costs of these sensors can be significantly reduced.

In the above, the integrated circuit may further include a selection circuit for selecting whether the self-diagnosis circuit is activated or not based on an input of an external selection signal and the terminals may further include a self-diagnosis selection terminal for transmitting the selection signal, and a self-diagnosis output terminal for transmitting outputs of said self-diagnosis circuit. The integrated circuit may further include a timer setting circuit for setting a specified timer timing based on an input of an external signal and a power source circuit for supplying a stabilization power source for internal circuits based on power supplied from outside, and the detection circuit assembly may further include a timer setting terminal for transmitting from outside a selection signal for selecting whether the timer setting circuit is activated or not and an internal power source terminal for supplying the stabilization power source. The integrated circuit may further include a light ON/dark ON switching circuit for switching between a light ON operation and a dark ON operation based on an input of an external signal, the light ON operation being wherein the photoelectric sensor makes a detection output when light is received thereby, the dark ON operation being wherein the photoelectric sensor makes a detection output when light is screened therefrom, and the detection circuit assembly may further include a light ON/dark ON switching terminal for transmitting a signal that indicates whether the light ON operation or the dark ON operation is selected. The integrated circuit may further include a main amplifier circuit for adjusting sensitivity to the quantity of received light based on an input from outside and a preamplifier circuit for outputting the quantity of received light, and the detection circuit assembly may further include an main amplifier input terminal for transmitting an input signal to the main amplifier circuit and a preamplifier output terminal for transmitting outputs from the preamplifier circuit.

The optical assembly may further include a light emitting element, the integrated circuit further including an emission stopping circuit for stopping driving the light emitting element based on an input of an external signal and the detection circuit assembly may further include an external diagnosis input terminal for transmitting a signal that indicates whether the emission stopping circuit is activated or not. The optical assembly may further include a light emitting element, the integrated circuit further including a current adjusting circuit for adjusting a light-emitting current that flows through the light emitting element based on an input of an external signal and the detecting circuit assembly may further include a current adjusting terminal for transmitting a signal that indicates whether the current adjusting circuit is activated or not.

The lens of the optical assembly may include a light emitting lens and a light-receiving lens or only a light-receiving lens.

A photoelectric sensor according to this invention may be characterized as comprising a detection terminal module having an optical assembly including a lens and a holder which holds the lens and a detection circuit assembly which is integrally formed with the optical assembly and includes an integrated circuit and terminals connected to the integrated circuit, an output terminal module having an output circuit incorporated therein, and a case that holds the detection terminal module and the output terminal module. In the above, the integrated circuit includes a detection circuit for detecting presence or absence of a target object of detection for the photoelectric sensor from a light-reception signal obtained by converting light received through the lens into an electrical signal by a light receiving element, a self-analysis circuit for judging the signal level of the light-reception signal by comparing the signal level of the light-reception signal with a specified threshold value and a judging circuit for judging presence or absence of light entering the light receiving element or operating condition of the photoelectric sensor inclusive of result of judging by the self-analysis circuit. The terminals include a control output terminal for transmitting outputs of the detection circuit, a stability display terminal for transmitting outputs of the self-analysis circuit, an indicator terminal for transmitting outputs of the judging circuit, a sensor power source terminal for supplying power for the integrated circuit and a GND terminal for keeping the integrated circuit at the zero voltage level. The output terminal module includes an output circuit for outputting an object detecting signal indicative of detection of an object based on a signal from the control output terminal, a first driver circuit for driving a stability displaying first light emitting element based on a signal from the stability display terminal and a second driver circuit for driving an indictor second light emitting element based on a signal from the indicator terminal. The detection terminal module and the output terminal module are electrically connected at least through the control output terminal, the stability display terminal, the indicator terminal, the sensor power source terminal and the GND terminal.

In the above, the integrated circuit may further include a selection circuit for selecting whether the self-diagnosis circuit is activated or not based on an input of an external selection signal, the terminals may further include a self-diagnosis selection terminal for transmitting the selection signal and a self-diagnosis output terminal for transmitting outputs of the self-diagnosis circuit when the self-diagnosis circuit is selected to be activated, the output terminal module may further include a judgment result outputting circuit for outputting judgment result inputted from the self-diagnosis output terminal, the detection terminal module and the output terminal module are electrically connected also through the self-diagnosis selection terminal and the self-diagnosis output terminal and an output from the self-diagnosis circuit is transmitted when a self-diagnosis execution signal is inputted to the self-diagnosis selection terminal.

The integrated circuit may further include a timer setting circuit for setting a specified timer timing based on an input of an external signal and a power source circuit for supplying a stabilization power source for internal circuits based on power supplied from outside, the detection circuit assembly may further include a timer setting terminal for transmitting a selection signal for selecting whether the timer setting circuit is activated or not and an internal power source terminal for supplying the stabilization power source, the detection terminal module and the output terminal module are electrically connected also through the timer setting terminal and the internal power source terminal and the timer timing is set by the timer setting circuit when a timer setting signal is transmitted through the timer setting terminal.

The integrated circuit may further include a light ON/dark ON switching circuit for switching between a light ON operation and a dark ON operation based on an input of an external signal, the light ON operation being wherein the photoelectric sensor makes a detection output when light is received thereby, the dark ON operation being wherein the photoelectric sensor makes a detection output when light is screened therefrom, the detection circuit assembly may further include a light ON/dark ON switching terminal for transmitting from outside a signal that indicates whether the light ON operation or the dark ON operation is selected, the detection terminal module and the output terminal module are electrically connected also through the light ON/dark ON switching terminal, and a control for switching between the light ON operation and the dark ON operation is carried out by the light ON/dark ON switching circuit when a switching signal is transmitted to the light ON/dark ON switching terminal.

The integrated circuit may further include a main amplifier circuit for adjusting sensitivity to the quantity of received light based on an input and a preamplifier circuit for outputting the quantity of received light and the detection circuit assembly may further include an main amplifier input terminal for transmitting an input signal to the main amplifier circuit, a preamplifier output terminal for transmitting outputs from the preamplifier circuit, the output terminal module may further include a sensitivity adjusting circuit for adjusting sensitivity to quantity of received light based on outputs from the preamplifier circuit, the detection terminal module and the output terminal module are electrically connected also through the main amplifier input terminal and the preamplifier output terminal, and the photoelectric sensor adjusts sensitivity to quantity of received light by operations of the sensitivity adjusting circuit.

The optical assembly may further include a light emitting element, the integrated circuit may further include an emission stopping circuit for stopping driving the light emitting element based on an input of an external signal, the detection circuit assembly may further include an external diagnosis input terminal for transmitting a signal that indicates whether the emission stopping circuit is activated or not, the detection terminal module and the output terminal module are electrically connected also through the external diagnosis input terminal, and the photoelectric sensor carries out external diagnosis function by stopping light emission by the emission stopping circuit when an external diagnosis signal is transmitted to the external diagnosis input terminal.

The optical assembly may further include a light emitting element, the integrated circuit may further include a current adjusting circuit for adjusting a light-emitting current that flows through the light emitting element based on an input of an external signal, the detecting circuit assembly may further include a current adjusting terminal for transmitting a signal that indicates whether the current adjusting circuit is activated or not, the detection terminal module and the output terminal module are electrically connected also through the current adjusting terminal, and the photoelectric sensor adjusts the light-emitting current by the current adjusting circuit when a light-emitting current adjusting signal is transmitted to the current adjusting terminal.

The photoelectric sensor of this invention is structured as any of the group of sensors consisting of a recursion reflective photoelectric sensor, a distance-settable photoelectric sensor and a transmissive photoelectric sensor.

DETAILED DESCRIPTION OF THE INVENTION

The invention is described next by way of examples but it goes without saying that these examples are not intended to limit the scope of the invention.

A photoelectric sensor according to the embodiment of the invention to be described is comprised of an optical assembly, a detection circuit assembly, an output circuit assembly and a case, a detector terminal module (hereinafter simply referred to as a module) being formed by the optical assembly and the detection circuit assembly. Four different types of module will be described in what follows.

Figure 1:
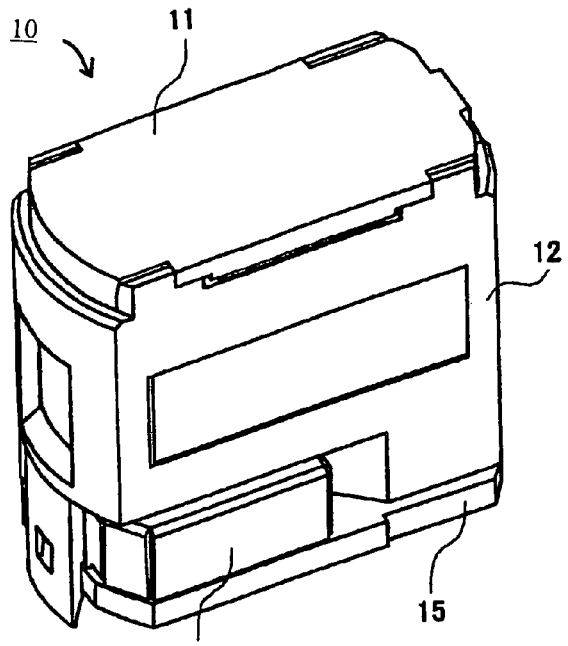
FIG. 1 is an external view of a diffuse reflective type module embodying this invention.
Figure 3A:
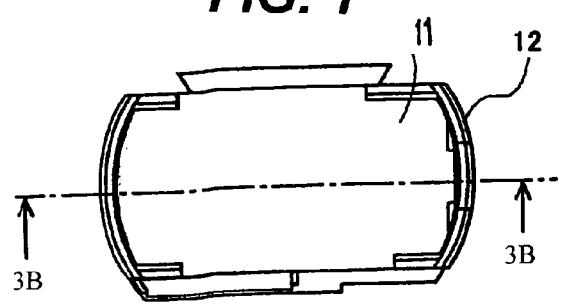
FIG. 3A is a plan view of its holder and FIG. 3B is a sectional view taken along line 3B—3B of FIG. 3A.
Figure 3B:
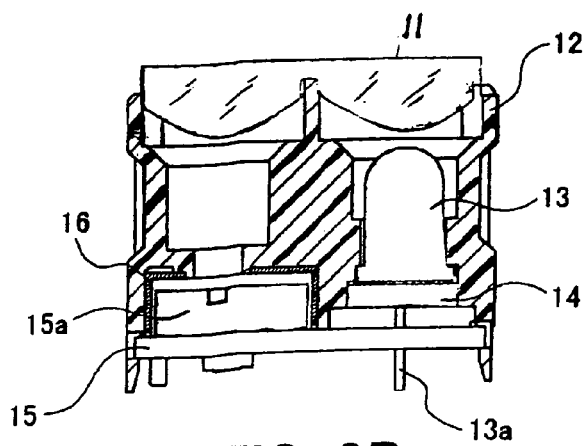
Figure 2:
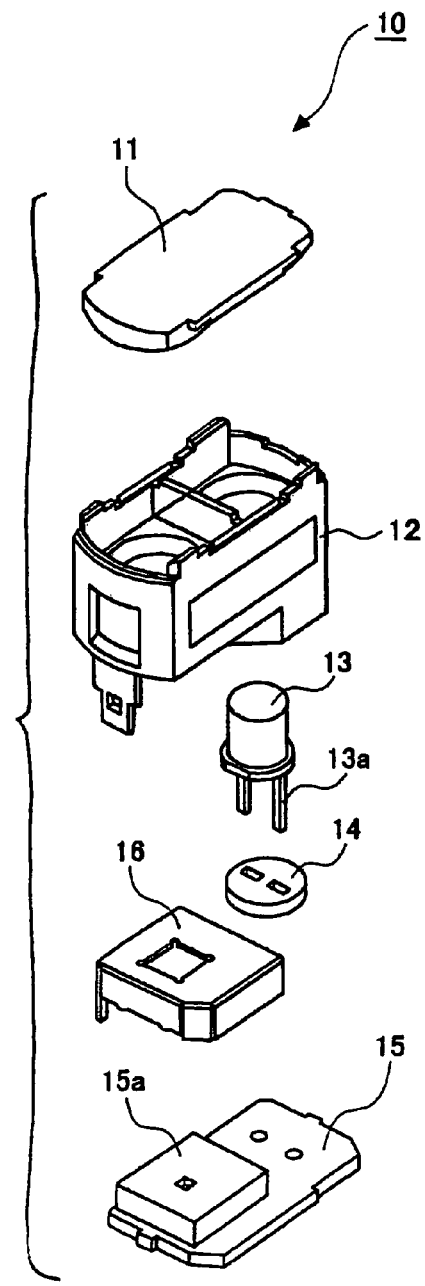
FIG. 2 is an exploded diagonal view of the diffuse reflective type module of FIG. 1.

FIG. 1 shows an external view of a module 10 of the diffuse reflective type comprised, as shown in FIGS. 2, 3A and 3B, of a lens 11, a holder 12, an LED 13, a bushing 14, a hybrid integrated circuit (HIC) board 15 and a plate shield 16. The lens 11 is welded to the holder 12 by means of an ultrasonic welder. The LED 13 is pressed into the holder 12 with its lead parts 13a soldered to the HIC board 15 through the bushing 14.

The plate shield 16 is set on a photo IC 15a of the HIC board 15 so as to eliminate unwanted effects of electromagnetic noise from outside on the photo IC 15a. The upper surface of the plate shield 16 is positioned according to the sectionally quadrangular protrusion (not shown) on the base of the holder 12. The lens 11 has a flat upper surface and includes both a light-emitting lens and a light-receiving lens which are formed together as a single body, each being convex in the downward direction, as shown in FIG. 3B.

Figure 4:
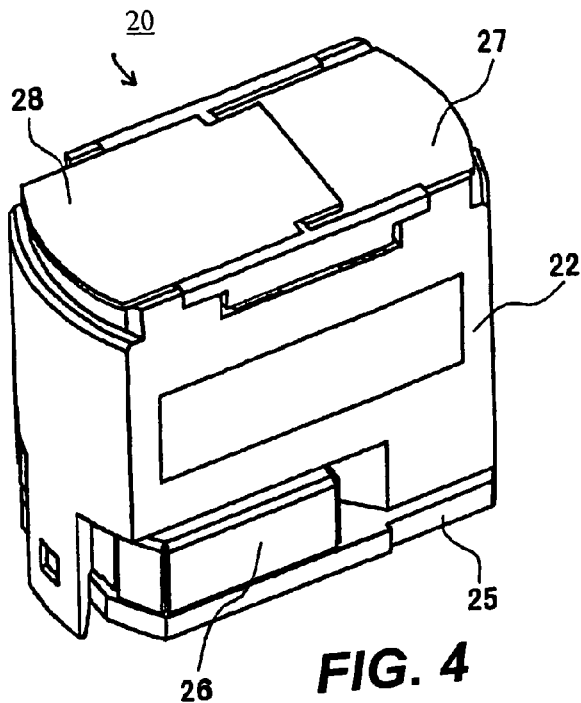
FIG. 4 is an external view of a recursion reflective type module embodying this invention.
Figure 6A:
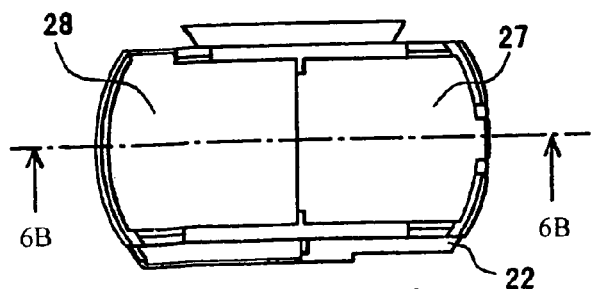
FIG. 6A is a plan view of its holder and FIG. 6B is a sectional view taken along line 6B—6B of FIG. 6A.
Figure 6B:
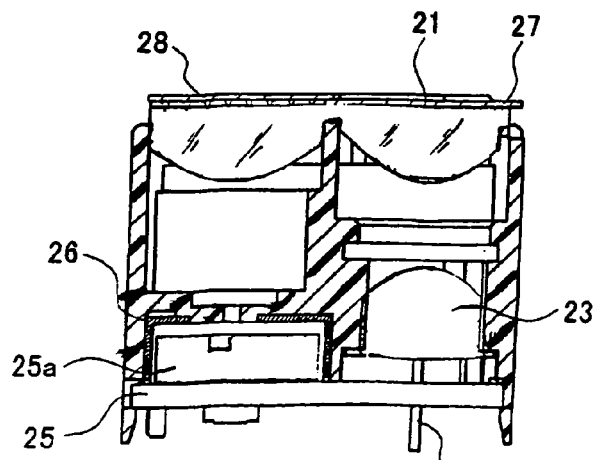
Figure 5:
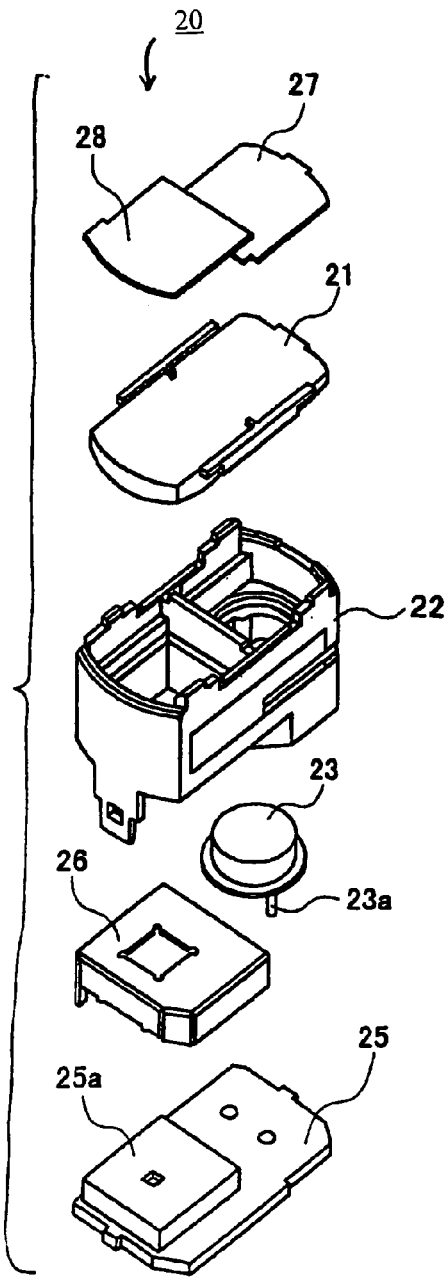
FIG. 5 is an exploded diagonal view of the recursion reflective type module of FIG. 4.

FIG. 4 shows an external view of a module 20 of the recursion reflective type comprised, as shown in FIGS. 5, 6A and 6B, of a lens 21, a holder 22, an LED 23, an HIC board 25, a plate shield 26 and polarizing plates 27 and 28 respectively on the light-emitting side and on the light-receiving side. The lens 21 is welded to the holder 22 by means of an ultrasonic welder. The LED 23 is pressed into the holder 22 with its lead parts 23a soldered to the HIC board 25.

The plate shield 26 is set on the photo IC 25a of the HIC board 25 so as to eliminate unwanted effects of electromagnetic noise from outside on the photo IC 25a. The upper surface of the plate shield 26 is positioned according to the sectionally quadrangular protrusion (not shown) on the base of the holder 22. The lens 21 has an approximately flat upper surface and includes both a light-emitting lens and a light-receiving lens which are formed together as a single body, each being convex in the downward direction. As shown in FIG. 6B, the polarizing plates 27 and 28 are pasted respectively onto the light-emitting part on the right-hand side and the light-receiving part on the left-hand side of the lens 21.

Figure 7:
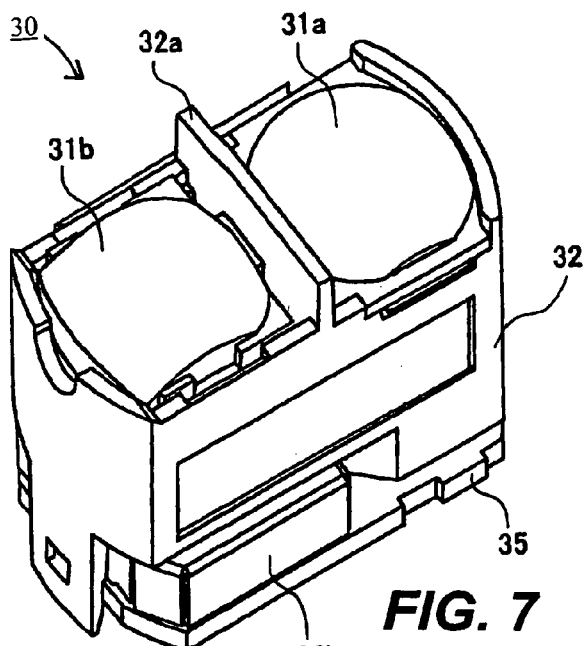
FIG. 7 is an external view of a recursion reflective type module embodying this invention.
Figure 9A:
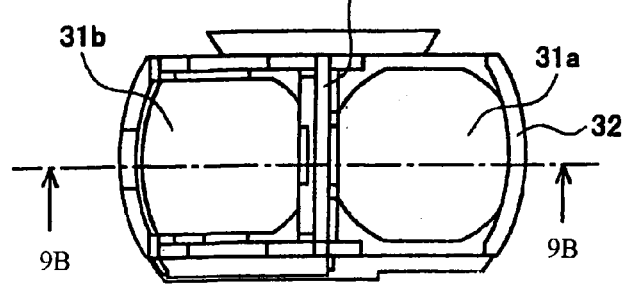
FIG. 9A is a plan view of its holder and FIG. 9B is a sectional view taken along line 9B—9B of FIG. 9A.
Figure 9B:
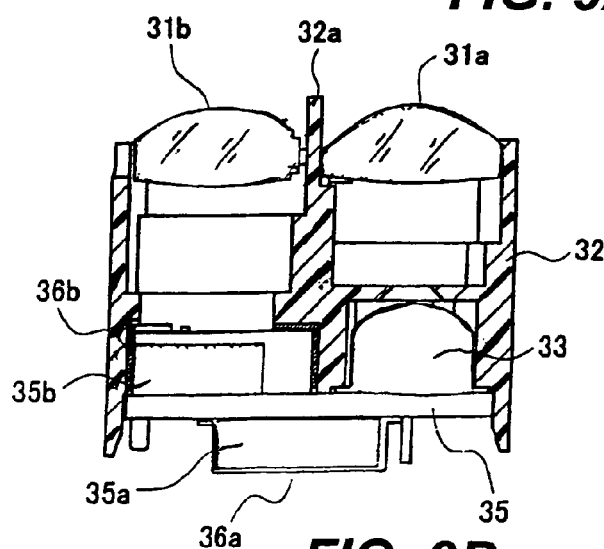
Figure 8:
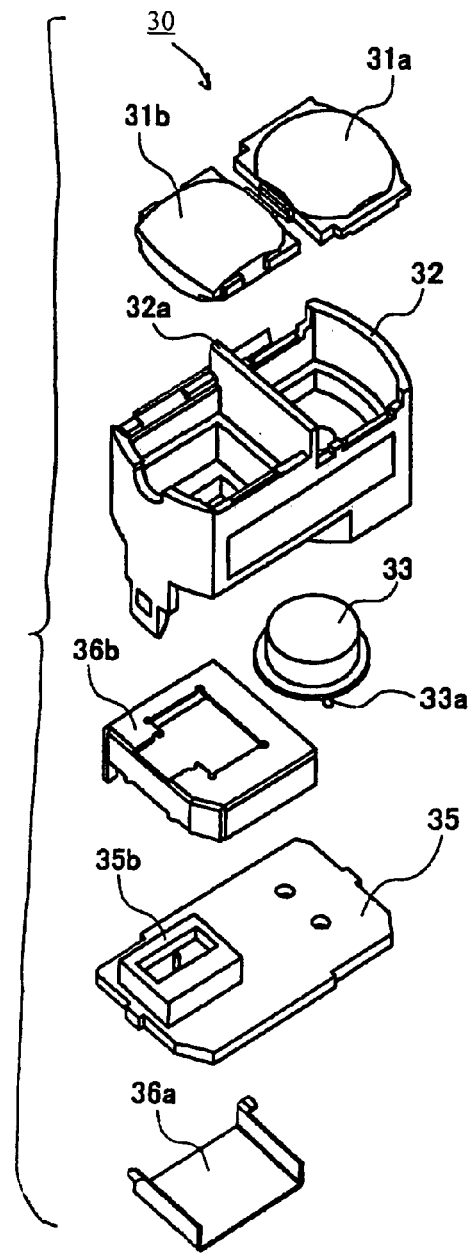
FIG. 8 is an exploded diagonal view of the recursion reflective type module of FIG. 7.

FIG. 7 shows an external view of a module 30 of the distance-settable (BGS/FGS) type comprised, as shown in FIGS. 8, 9A and 9B, of a light-emitting lens 31a, a light-receiving lens 31b, a holder 32, an LED 33, an HIC board 35, a lower plate shield 36a and an upper plate shield 36b. The light-emitting lens 31a is welded to the holder 32 by means of an ultrasonic welder. The LED 33 is pressed into the holder 32 with its lead parts 33a soldered to the HIC board 35. In the above, BGS (background suppressing) means the function of not detecting the background side of a specified distance and FGS (foreground suppressing) means the function of not detecting the foreground side of the specified distance.

The lower plate shield 36a is set on the photo IC 35a provided below the HIC board 35 so as to eliminate unwanted effects of electromagnetic noise from outside on the photo IC 35*a*. The upper plate shield 36*b* is set on a photodiode 35*b* of the two-piece configuration above the HIC board 35 so as to eliminate unwanted effects of electromagnetic noise from outside on the photodiode 35*b*. The upper surface of the plate shield 36*b* is positioned according to the sectionally quadrangular protrusion (not shown) on the base of the holder 32.

The light-emitting lens 31*a* and the light-receiving lens 31*b* each have a convex upper surface, as shown in FIG. 9B. A partition 32*a* is formed between the set positions of the light-emitting lens 31*a* and the light-receiving lens 31*b* on the holder 32. When the light-receiving lens 21*b* is installed, it is set on an alignment jig (not shown) and is attached to the holder 32 by using a resin which hardens by ultraviolet radiation at a position such that the near and far light-receiving parts have the same output for reflected light from a target object at a specified distance under a condition where power is applied to the module 30.

Figure 10:
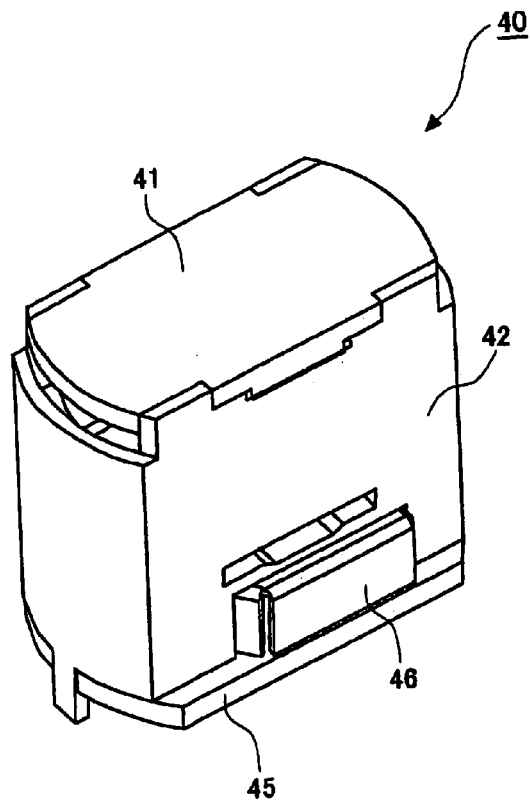
FIG. 10 is an external view of a transmissive type module embodying this invention.
Figure 11:
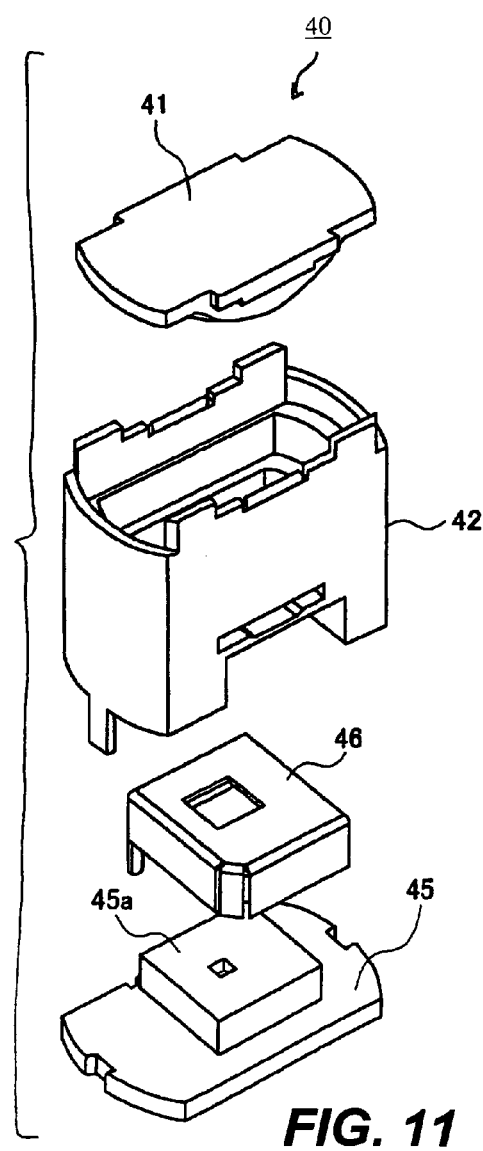
FIG. 11 is an exploded diagonal view of the transmissive type module of FIG. 10.

FIG. 10 is an external diagonal view of a transmissive type module (light-receiving device) 40 comprised, as shown in FIG. 11, of a light-receiving lens 41, a holder 42, an HIC board 45 and a plate shield 46. The light-receiving lens 41 is welded to the holder 42 by means of an ultrasonic welder. The plate shield 46 is set on the photo IC 45*a* of the HIC board 45. The upper surface of the plate shield 46 is positioned according to the sectionally quadrangular protrusion (not shown) on the base of the holder 42. The light-receiving lens 41 has a flat upper surface and its lower surface is convex in the downward direction.

Figure 12:
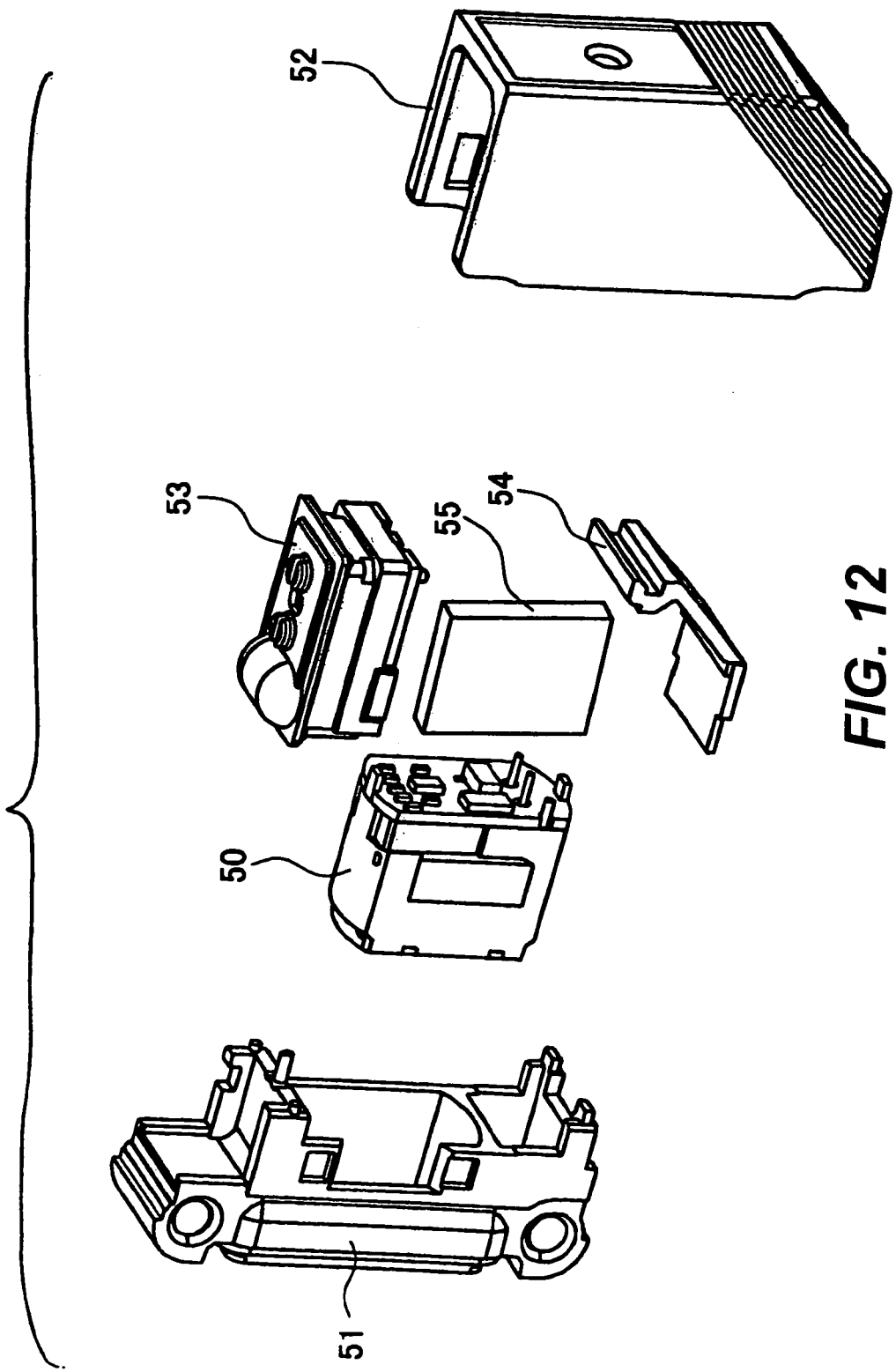
FIG. 12 is an exploded diagonal view of a rectangular case type photoelectric sensor.
Figure 13:
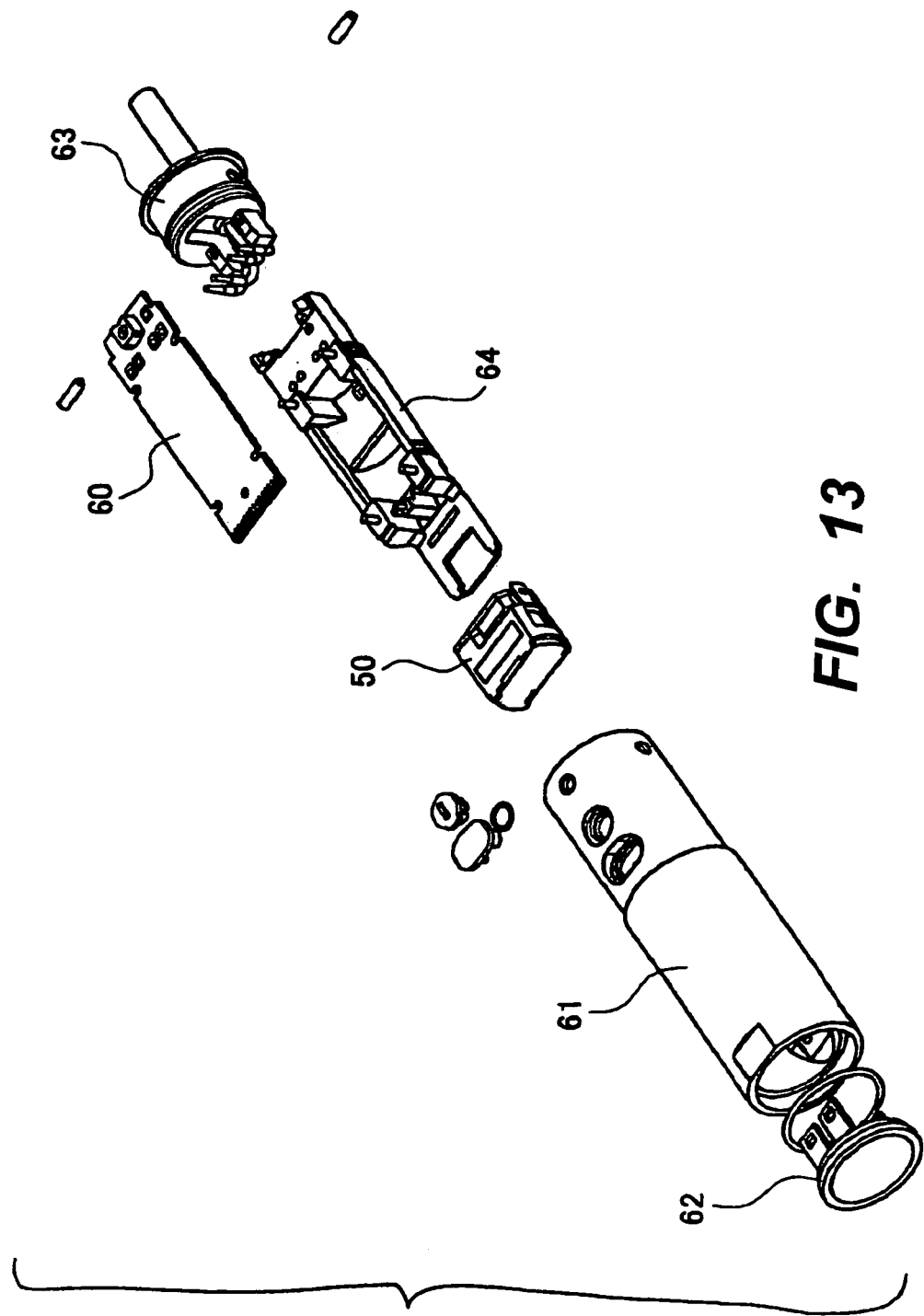
FIG. 13 is an exploded diagonal view of a cylindrical case type photoelectric sensor.

Each of these four kinds of the modules described above is adapted to be supported by a case together with the output circuit assembly to form a photoelectric sensor. The case of a photoelectric sensor may assume a different shape. As examples, FIGS. 12 and 13 show a rectangular case and a cylindrical case, respectively. As shown in FIG. 12, the rectangular case is provided with a base 51, a side cover 52, a top cover 53 and a bottom cover 54. A module 50 is placed inside the case together with an output circuit assembly 52 to form a photoelectric sensor of a rectangular case type. As shown in FIG. 13, the cylindrical case is provided with a main case body 61, a case lens 62, a cap 63 and a base 64. A cylindrical case type photoelectric sensor is formed by mounting an output circuit assembly 60 and the module 50 to the base 64, storing this base 64 inside the main case body 61 and attaching the cap 63 and the case lens 62 to this main case body 61. The module 50 may be of the diffuse reflective type, the recursion reflective type, the distance-settable type or the transmissive type. The output circuit assembly 55 stored inside the rectangular case and the output circuit assembly 60 stored inside the cylindrical case are both for being adapted to the type of the module 50. As will be explained in detail below, output circuit assemblies of different types may be combined with a single module to form different photoelectric sensors with different functions.

Figure 14:
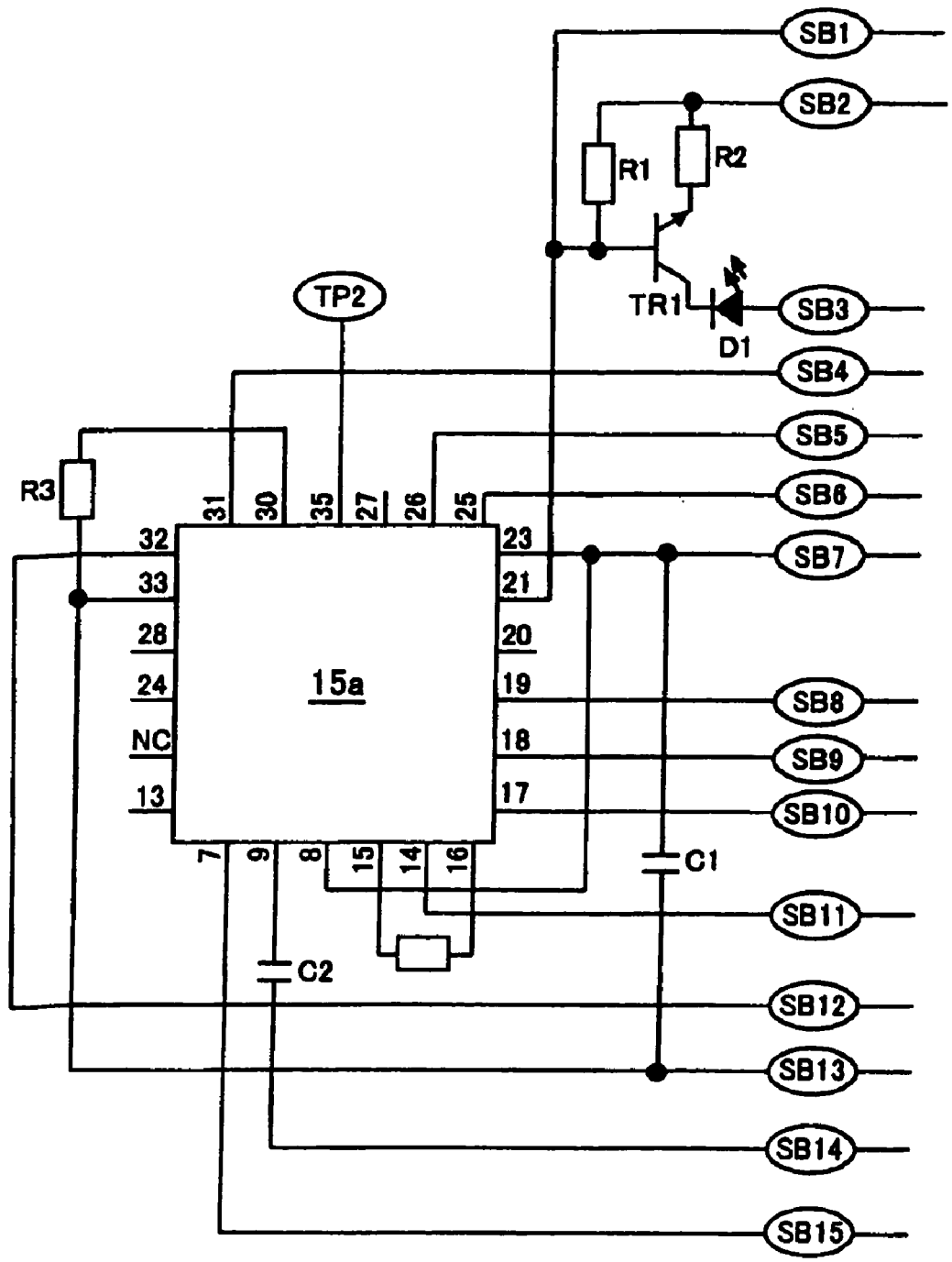
FIG. 14 is a circuit diagram of a detector circuit assembly of the recursion and diffuse type module.

Next, the electrical hardware structures of modules are explained. FIG. 14 is a circuit diagram of the HIC board (detector circuit assembly) 15 of the diffuse reflective type module 10. The circuit diagram of the HIC board (detector circuit assembly) 25 that forms the recursion reflective type module 20 is the same.

The detector circuit assembly 15 is provided with fifteen terminals SB1–SB15 and the photo IC 15*a*. Terminal SB1 is for external diagnosis (or the function of checking before the actual use whether there is no trouble with the sensor and the connection is alright, etc.), being connected to the 21st pin of the photo IC 15*a*. Terminal SB2 is for adjustment of current for light emission, being connected to the base and the emitter of transistor TRI respectively through resistor R1 and resistor R2. The base of this transistor TRI is connected also to the 21st pin of the photo IC 15*a* and its collector is connected to the cathode of a light-emitting LED D1. The anode of this light-emitting LED D1 is connected to terminal SB3 which is a terminal for supplying source voltage VCC to the light-emitting LED D1. Terminal SB4 is a self-diagnosis selection terminal and is connected to the 31st pin of the photo IC 15*a*. Terminal SB5 is a stability display light terminal and is connected to the 26th pin of the photo IC 15*a*. Terminal SB6 is a sensor power source terminal and is connected to the 25th pin of the photo IC 15*a*. Terminal SB7 is an internal power source terminal and is connected to the 23rd and 8th pins of the photo IC 15*a*. Terminal SB8 is a self-diagnosis output terminal and is connected to the 19th pin of the photo IC 15*a*. Terminal SB9 is an indicator terminal and is connected to the 18th pin of the photo IC 15*a*. Terminal SB10 is a control output terminal and is connected to the 17th pin of the photo IC 15*a*. Terminal SB11 is a timer setting terminal and is connected to the 14th pin of the photo IC 15*a*. Terminal SB12 is a light ON/dark ON switching terminal and is connected to the 32nd pin of the photo IC 15*a*. Terminal SB13 is a ground (GND) terminal and is connected to the 33rd pin of the photo IC 15*a* and also through resistor R3 to the 30th pin of the photo IC 15*a*. Terminal SB13 is also connected through capacitor C1 to terminal SB7. Terminal SB14 is a main amplifier input terminal and is connected through capacitor C2 to the 9th pin of the photo IC 15*a*. Terminal SB15 is a preamplifier output terminal and is connected to the 7th pin of the photo IC 15*a*.

Figure 15:
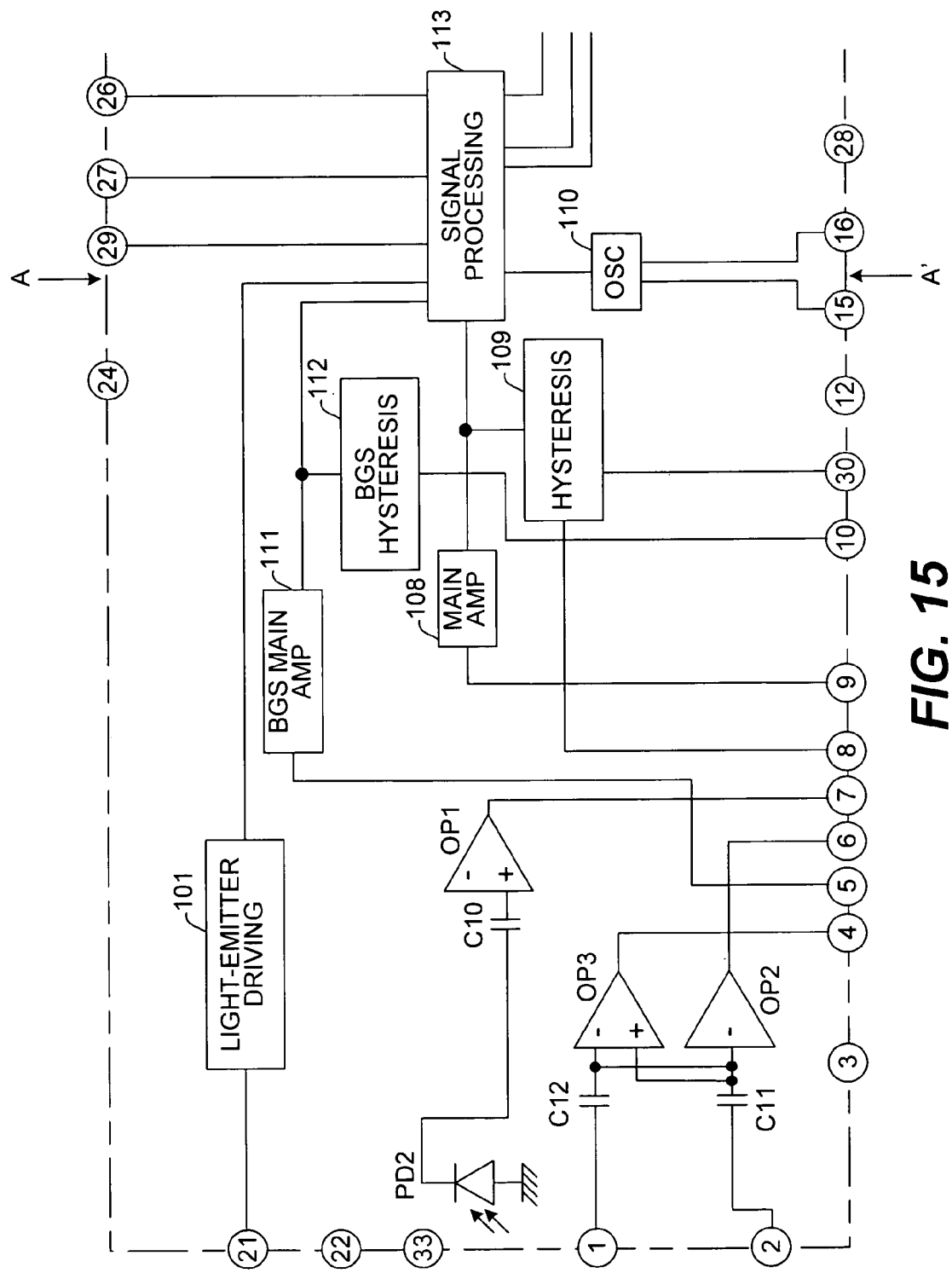
FIGS. 15 and 16 show the internal structure of the photo IC, respectively showing its left-hand half and right-hand half.
Figure 16:
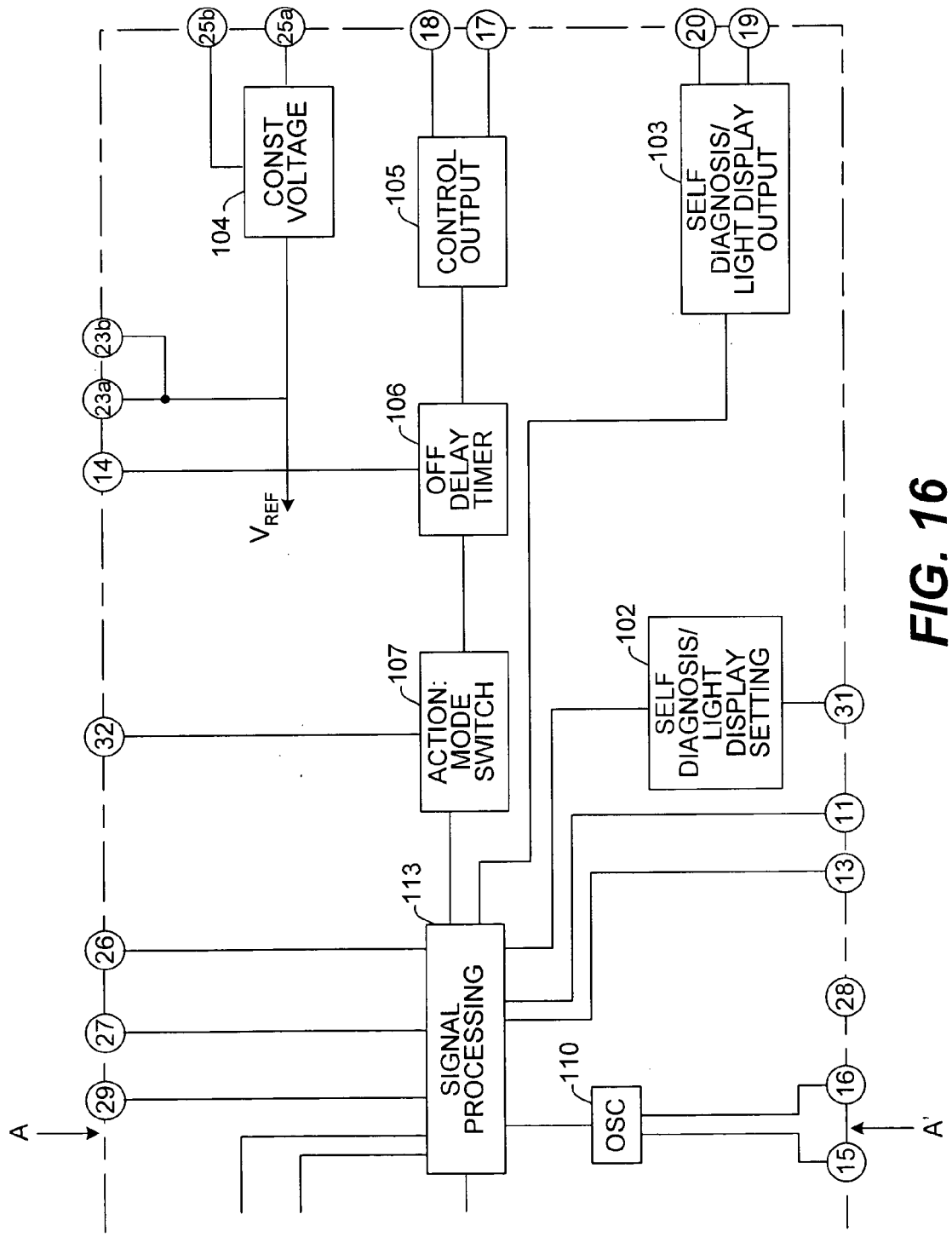

The internal structure of the photo IC 15*a* of the detection circuit assembly 15 is shown in FIGS. 15 and 16. As shown, the photo IC 15*a* is provided with a light-emitter driver circuit 101, a self-diagnosis/incoming light display setting part 102, a self-diagnosis/incoming light display output part 103, a constant voltage circuit 104, a control output part 105, an off-delay timer setting part 106, an action mode switching part 107, a main amplifier 108, a hysteresis setting circuit 109, an oscillator circuit 110, a BGS main amplifier 111, a BGS hysteresis setting circuit 112, an inner light-receiving element PD2 and a signal processing circuit 113. The BGS main amplifier 111 and the BGS hysteresis setting circuit 112 are used when the module is used to function as a distance-settable type module.

The light-emitter driver circuit 101 is connected to the 21st pin. The self-diagnosis/incoming light display setting part 102 is connected to the 31st pin. The self-diagnosis/incoming light display output part 103 is connected to the 19th pin and the 20th pin. The constant voltage circuit 104 is connected to the 25th pin and the 23rd pin and serves to supply stable power to the interior of the IC 15*a*. The control output part 105 is connected to the 17th pin and the 18th pin. The off-delay timer setting part 106 is connected to the 14th pin. The action mode switching part 107 is connected to the 32nd pin and serves to carry out the light ON/dark ON switching. The main amplifier 108 is connected to the 9th pin. The cathode of the inner light-receiving element PD2 inputs to the plus-terminal of a first operational amplifier OP1 through capacitor C10 and the output terminal of the first operational amplifier OP1 is connected to the 7th pin. A second amplifier OP2 has its input terminal connected to the 2nd pin through capacitor C11 and its output terminal connected to the 6th pin. The signal processing circuit 113 is connected to the 26th, 27th and 29th pins. A differential amplifier OP3 has its input terminals connected to the first and second pins respectively through capacitors C12 and C11 and its output terminal connected to the 4th pin. The BGS main amplifier 111 is connected to the 5th pin and the BGS hysteresis setting circuit 112 is connected to the 10th pin. In the case of a diffuse reflective module, the first–6th pins and the 10th pins are not required and are not used, and only the pins that are required are connected in the detection circuit assembly 15.

The detection circuit assembly 15 is structured so as to carry out functions such as the self-diagnosis function, the timer setting function, the light ON/dark ON switching function, sensitivity (to the quantity of received light) adjusting function, the external diagnosis function and the light-emission current adjusting function according to the actions of the photo IC 15a. In the above, the self-diagnosis function is a function for outputting the condition of incoming light quantity either singly or in combination and the light-emission is stopped if the external diagnosis function is selected.

Figure 17:
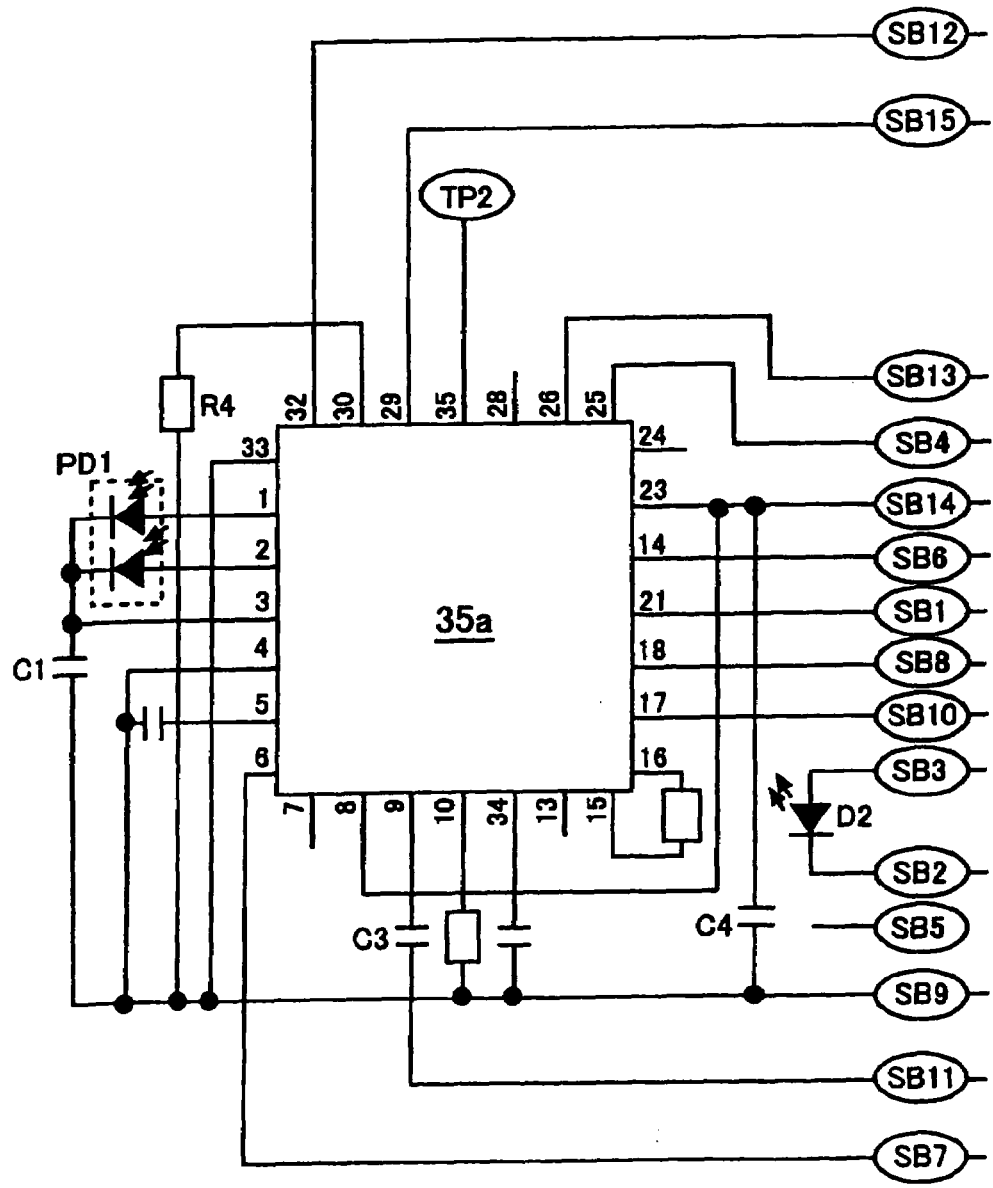
FIG. 17 is a circuit diagram of the detection circuit assembly of the distance-settable type module.

FIG. 17 is a circuit diagram of the HIC board 35 (detection circuit assembly) that forms the distance-settable type module 30, comprising fifteen terminals SB1–SB15 and a photo IC 35a. The photo IC 35a is structured similarly to the photo IC 15a of the diffuse reflective type module except that the pins not required for the distance-settable type module are not used.

With reference to FIG. 17, terminal SB1 is for driving light-emitting LED and is connected to the 21st pin of the IC. Terminal SB2 is for adjusting light-emitting current and Terminal SB3 is for supplying source voltage VCC to the light-emitting LED (D2). Terminal SB2 is connected to the cathode of the light-emitting LED (D2) of which the anode is connected to Terminal SB3. Terminal SB4 is a sensor power source terminal and is connected to the 25th pin of the IC. Terminal SB5 is not connected anywhere. Terminal SB6 is a timer setting terminal and is connected to the 14th pin of the IC. Terminal SB7 is a preamplifier output terminal and is connected to the 6th pin of the IC. Terminal SB8 is an indicator terminal and is connected to the 18th pin of the IC. Terminal SB9 is a ground (GND) terminal and is connected to the 33rd pin of the IC and also to the 30th pin of the IC through resistor R4. Terminal SB10 is a control output terminal and is connected to the 17th pin of the IC. Terminal SB11 is a main amplifier input terminal and is connected to the 9th pin of the IC through capacitor C3. Terminal SB12 is a light ON/dark ON switching terminal and is connected to the 32nd pin of the IC. Terminal SB13 is a stability display light terminal and is connected to the 26th pin of the IC. Terminal SB14 is an internal power source terminal and is connected to the 23rd and 8th pins of the IC. Terminal SB14 is connected also to Terminal SB9 (GND) through capacitor C4. Terminal SB15 is a BGS/FGS switching terminal (to be described below) and is connected to the 29th pin of the IC.

Connected to the 1st and 2nd pins of the photo IC 35a is the anode of a photodiode PD1 of the two-piece configuration, its cathode being connected through capacitor C5 to the terminal SB9 (GND). This photodiode PD1 is partitioned into a near-side light receiving part and a far-side light receiving part. Since the 7th pin is adapted to be connected to the inner light-receiving element PD2, those of the pins that are not required for a distance-settable module are not used and only the pins required for a distance-settable module are connected in the case of the detection circuit assembly 35. As shown in FIG. 9, the photodiode 35b of the two-piece configuration is set above the HIC board 35 and the photo IC 35 is set below the HIC board 35 so as to be electrically connected to each other through a throughhole in the HIC board 35.

The detection circuit assembly 35 is structured so as to carry out functions such as the BGS/FGS switching function, the timer setting function, the light ON/dark ON switching function, the function of adjusting the quantity of received light and the function of adjusting the light-emitting current.

Figure 18:
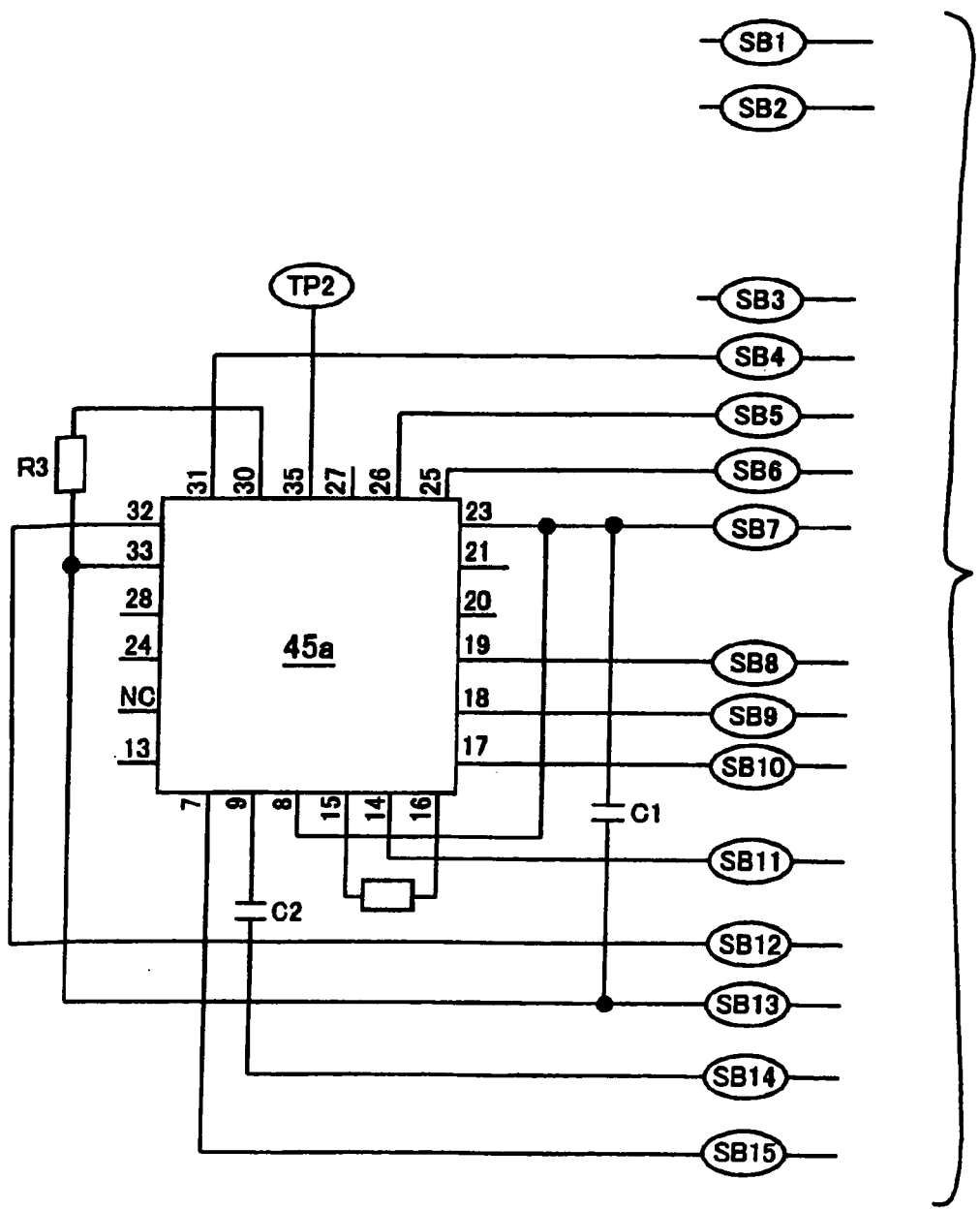
FIG. 18 is a circuit diagram of the detection circuit assembly of the transmissive type light-receiving device.

FIG. 18 is a circuit diagram of an HIC board 45 (detection circuit assembly) that forms a transmissive type photoelectric module (light-receiving device) 40, comprising 15 terminals SB1–SB15 and a photo IC 45a. The photo IC 45a is similar to the photo IC 15a of the diffuse reflective type module. The detection circuit assembly 45 is structured basically the same as the detection circuit assembly 15 of the diffuse reflective type photoelectric module.

Figure 19:
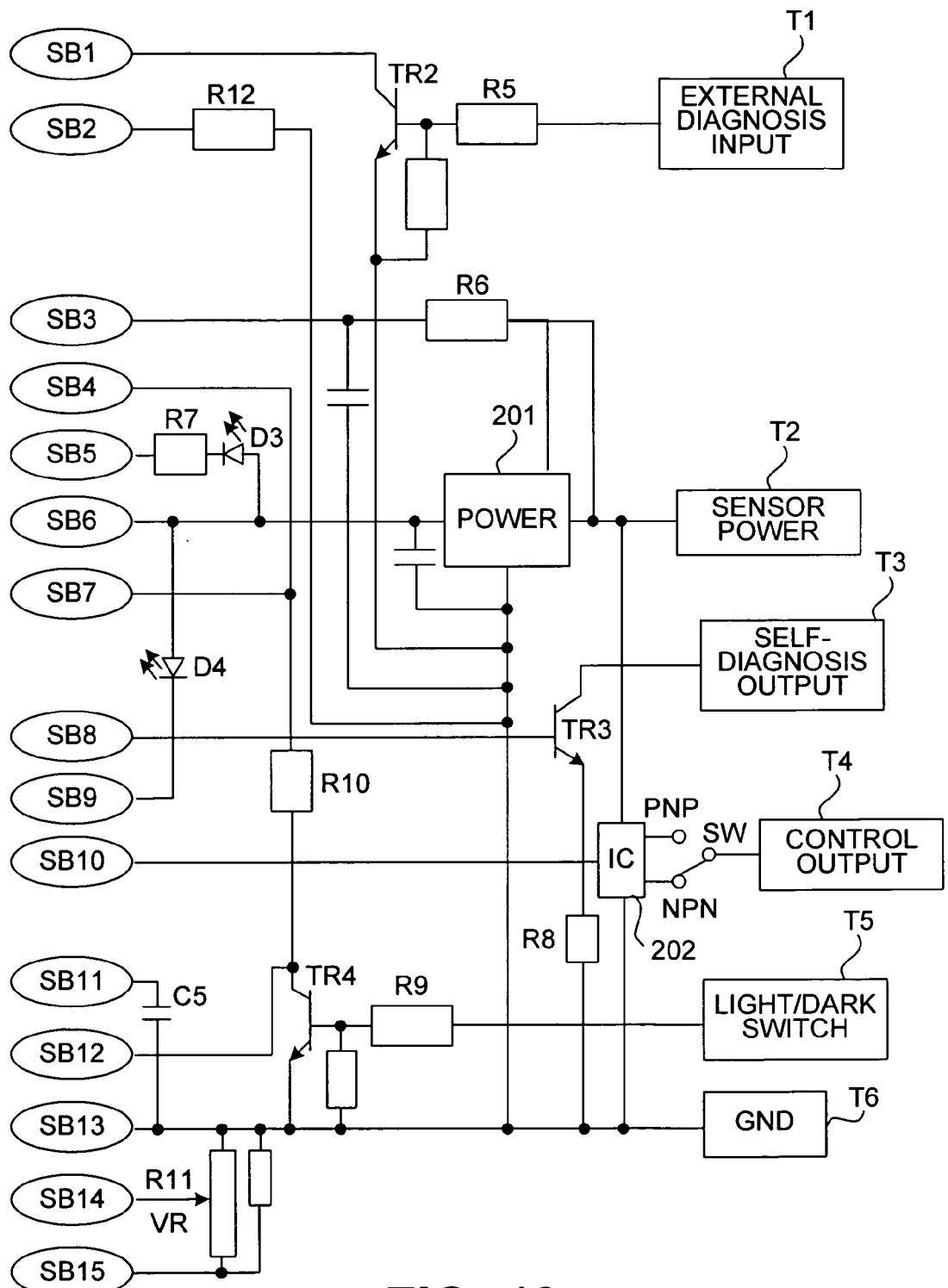
FIG. 19 is a circuit diagram of an output circuit assembly to be connected to the detection circuit assembly for employing all of the functions of the diffuse reflective type module.

FIG. 19 is a circuit diagram of an output circuit assembly 10b to be connected to the detection circuit assembly 15 for employing all of the functions of the diffuse reflective type module 10, comprising fifteen 15 terminals SB1–SB15 corresponding to the terminals of the detection circuit assembly 15. External diagnosis input terminal T1 is connected through resistor R5 to the base of transistor TR2 of which the collector is connected to terminal SB1 and the emitter is connected to terminal SB13 (GND). Sensor power terminal T2 is connected to the input terminal of a power source circuit 201 of which the output terminal is connected to terminal SB6. Sensor power terminal T2 is connected through resistor R6 to terminal SB3. The anode of the stability display light D3 is connected to the output terminal of the power source circuit 201 and its cathode is connected through resistor R7 to terminal SB5. The anode of indicator light D4 is connected to the output terminal of the power source circuit 201 and its cathode is connected to terminal SB9. Input terminal of IC 202 is connected to terminal SB10 and its PNP output terminal and NPN output terminal are connected through switch SW to control output terminal T4. The IC 202 is provided with terminals to be connected to the sensor power terminal T2 and terminal SB13. Self-diagnosis output terminal T3 is connected to the collector of transistor TR3 of which the base is connected to terminal SB8 and the emitter is connected through resistor R8 to terminal SB13 (GND). Light ON/dark ON switching terminal T5 is connected through resistor R9 to the base of transistor TR4 of which the emitter is connected to terminal SB13 (GND) and the collector is connected to terminal SB12 and through resistor R10 to terminal SB7 which is connected to terminal SB4. Capacitor C5 is connected between terminals SB11 and SB13. Variable resistor R11 has its two terminals respectively connected to terminals SB15 and SB13 and its fractional voltage terminal VR is connected to terminal SB14. Terminal SB2 is connected through resistor R12 to terminal SB13 and ground GND terminal T6.

A photoelectric sensor structured with the diffuse reflective type module 10 and the output circuit assembly 10b is provided with the self-diagnosis function, the timer setting function, the light ON/dark ON switching function, the function for adjusting the sensitivity of the received light quantity, the external diagnosis function and the function for adjusting the light-emitting current.

The self-diagnosis function can be selected by changing the voltage level of terminal SB4. If the voltage level of terminal SB4 is set to the ground level, a display of receiving light is made. If terminal SB4 is OPEN or at VCC, there is no self-diagnosis. If terminal SB4 is set equal to the IC internal stability voltage (Vref), it means that there is self-diagnosis. If there is no self-diagnosis, terminal SB8 becomes OPEN.

The timer setting function is to set the off-delay timing on the basis of the capacitance of capacitor C5. By changing the capacitance of capacitor C5, the off-delay timing is set.

The light ON/dark ON switching is effected by changing the voltage level of terminal SB12. If terminal SB12 is set at the ground level, the dark ON is set. If terminal SB12 is set OPEN or at the IC internal stability voltage (Vref), it becomes the light ON.

The function of adjusting the quantity of received light is to make use of a sensitivity adjusting circuit connected to the main amplifier input terminal and the preamplifier output terminal to adjust the sensitivity to the quantity of received light. The sensitivity to the quantity of received light can be adjusted by changing the value of the variable resistor R11.

The external diagnosis function can be selected by changing the voltage level of terminal SB1. If the voltage level of terminal SB1 is set to the ground level, the light emission is stopped. Light is emitted as terminal SB1 is set to the OPEN condition.

The function of adjusting the light-emitting current is to adjust the light-emitting current by means of the resistance value of resistor R12 such that the detection distance can be changed. The current for light emission can be varied by changing the resistance value of resistor R12.

The control output from the output circuit assembly 10b becomes a PNP output or an NPN output as switch SW is connected to the PNP output terminal or the NPN output terminal of an IC 202 having both a PNP transistor and an NPN transistor integrated thereon. In other words, since the output circuit assembly 10b contains both a PNP transistor and an NPN transistor, the components can be made compact and the production cost can be reduced.

Figure 20:
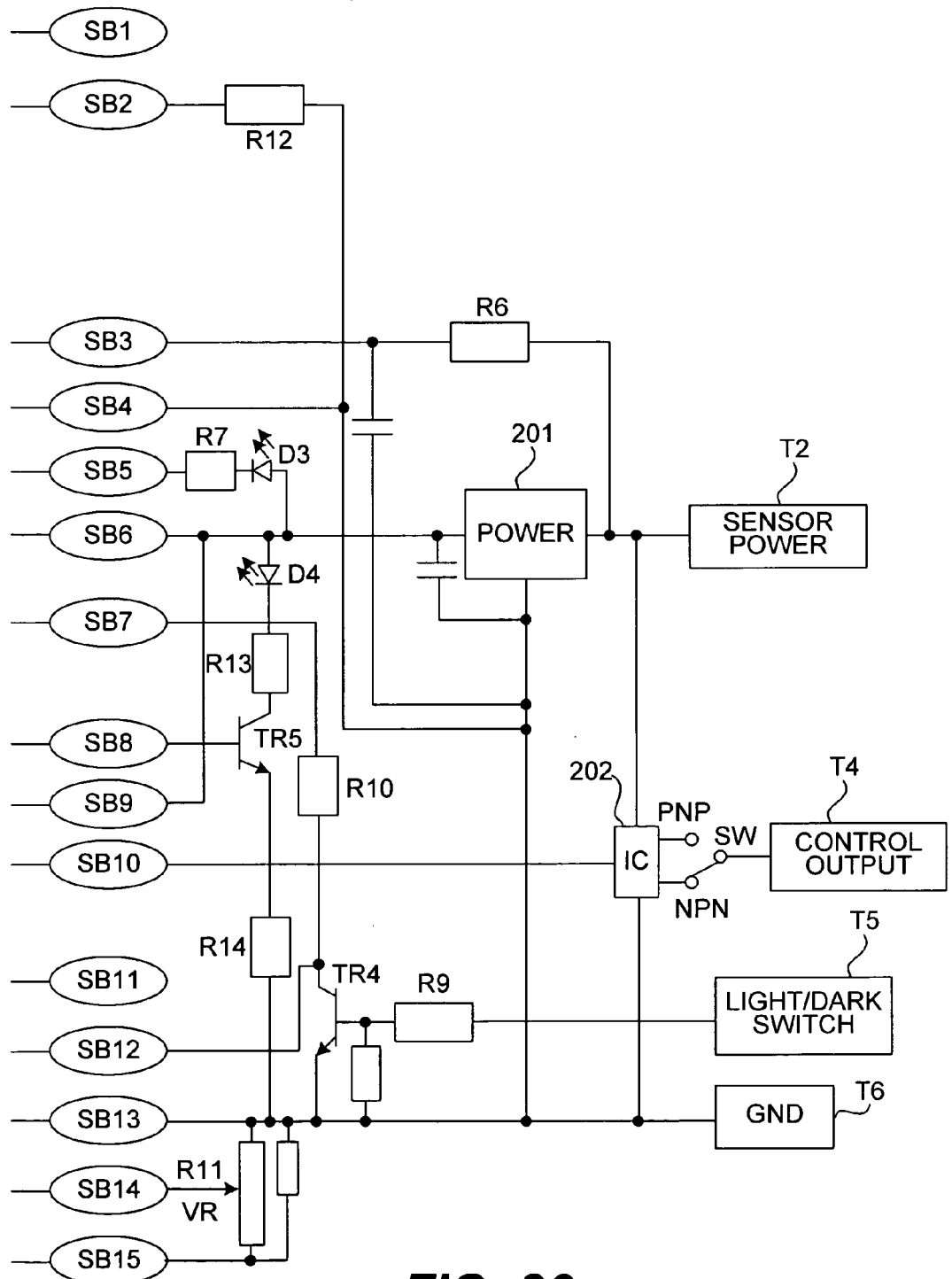
FIG. 20 is a circuit diagram of an output circuit assembly to be connected to the detection circuit assembly for employing a portion (functions A) of the functions of the diffuse reflective type module.

FIG. 20 is a circuit diagram of an output circuit assembly 10c to be connected to the detection circuit assembly 15 for employing only a portion (functions A) of the functions of the diffuse reflective type module 10, comprising fifteen terminals SB1–SB15 corresponding to the terminals of the detection circuit assembly 15. Since this output circuit assembly 10c is structured basically in the same way as the output circuit assembly 10b of the type that uses all of the functions of the detection circuit assembly, only the difference will be described below.

This output circuit assembly 10c does not employ the external diagnosis function, the self-diagnosis function or the timer setting function. In order to activate the function of the incoming light display light, terminal SB4 is connected to terminal SB13 while terminals SB1 and SB11 are not connected. In order to make the indicator light D4 to function as the incoming light display light, the anode of the indicator light D4 is connected to the output terminal of the power source circuit 201 and its cathode is connected through resistor R13 to the collector of transistor TR5 of which the base is connected to terminal SB8 and the emitter is connected through resistor R14 to terminal SB13. Thus, the condition of the indicator light D4 is changed according to the output condition of terminal SB8 such that the indicator light D4 can be made to function as the incoming light display light.

The photoelectric sensor formed with the diffuse reflective type module 10 and the output circuit assembly 10c is provided with the light ON/dark ON switching function, the function for adjusting the sensitivity to the quantity of received light and the function for adjusting the light-emitting current.

Figure 21:
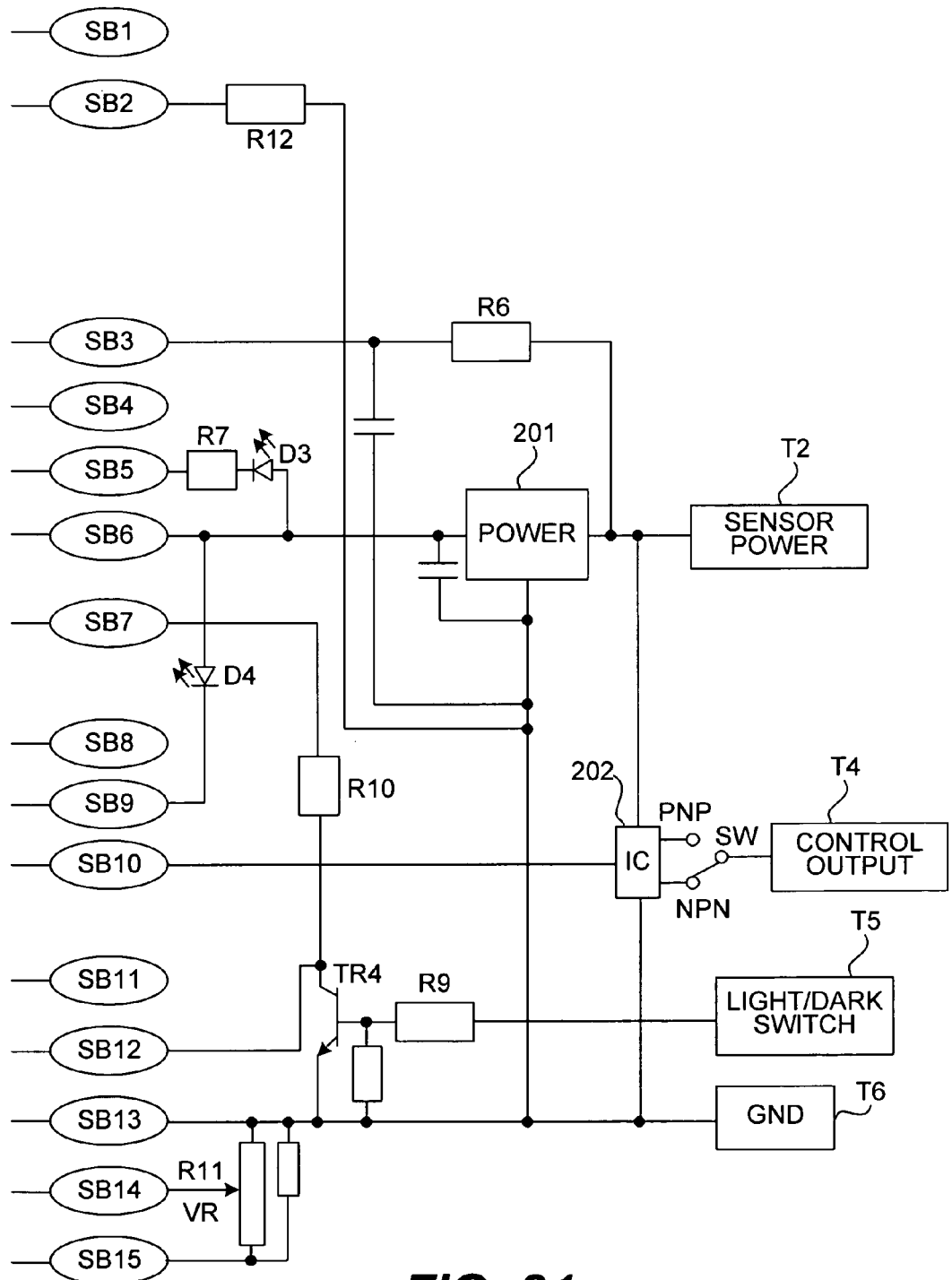
FIG. 21 is a circuit diagram of an output circuit assembly to be connected to the detection circuit assembly for employing another portion (functions B) of the functions of the diffuse reflective type module.

FIG. 21 is a circuit diagram of another output circuit assembly 10d to be connected to the detection circuit assembly 15 for employing another portion (functions B) of the functions of the diffuse reflective type module 10, comprising 15 terminals SB1–SB15 corresponding to the terminals of the detection circuit assembly 15. This output circuit assembly 10d, too, is structured basically in the same way as the output circuit assembly 10b of the type that uses all of the functions of the detection circuit assembly but is not provided with the external diagnosis function, the self-diagnosis function or the timer setting function and hence does not have terminals SB1, SB4, SB8 and SB11 connected. The photoelectric sensor formed with the diffuse reflective type module 10 and the output circuit assembly 10d is provided with the light ON/dark ON switching function, the function for adjusting the sensitivity to the quantity of received light and the function for adjusting the light-emitting current.

The output circuit assemblies 10b, 10c and 10d described above can be used also for the detection circuit assembly 25 of the recursion reflective type module 20 (the detection circuit assembly 15 of the diffuse reflective type module) and for the detection circuit assembly 45 of the transmissive type photoelectric module 40 (light receiving device).

Figure 22:
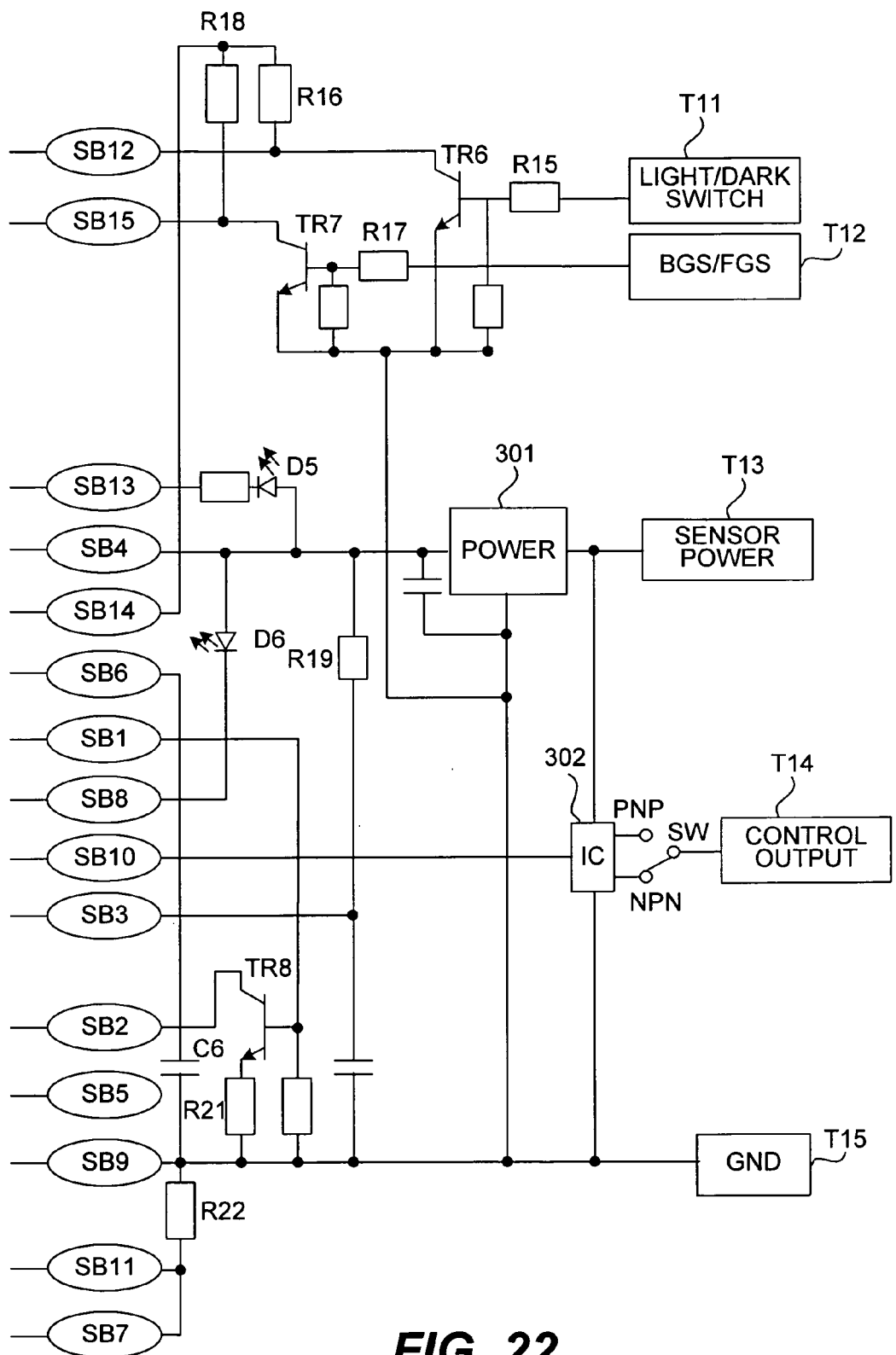
FIG. 22 is a circuit diagram of an output circuit assembly to be connected to the detection circuit assembly for employing all of the functions of the distance-settable type module.
Figure 23:
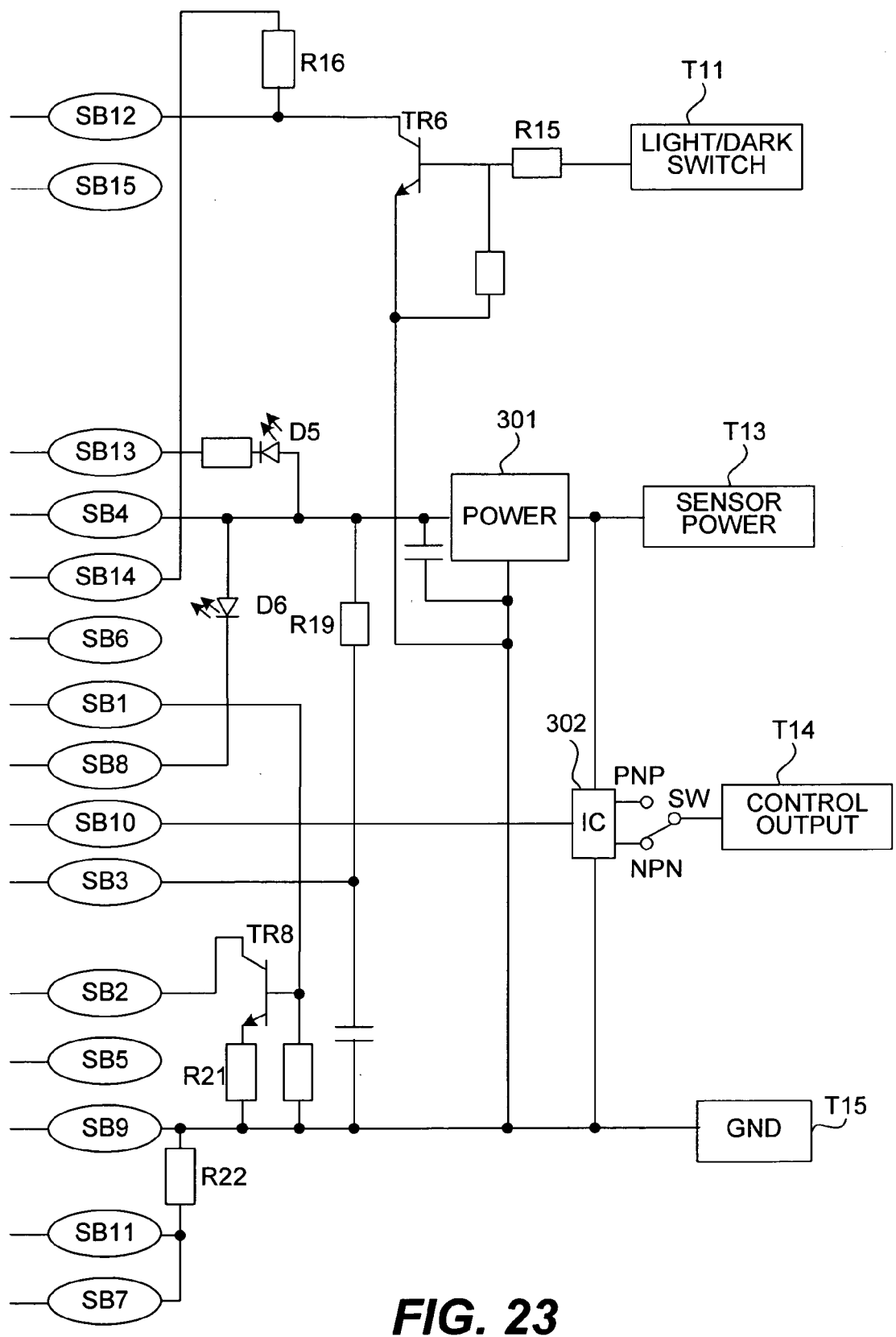
FIG. 23 is a circuit diagram of an output circuit assembly to be connected to the detection circuit assembly for employing a portion of the functions of the distance-settable type module.

FIG. 22 is a circuit diagram of an output circuit assembly 30b to be connected to the detection circuit assembly 35 for employing all of the functions of the distance-settable type module 30, comprising 15 terminals SB1–SB15 corresponding to the terminals of the detection circuit assembly 35.

Light ON/dark ON switching terminal T11 is connected through resistor R15 to the base of transistor TR6 of which the collector is connected to terminal SB12 and through resistor R16 to terminal SB14 and the emitter is connected to terminal SB9 (GND). The BGS/FGS switching terminal T12 is connected through resistor R17 to the base of transistor TR7 of which the collector is connected to terminal SB15 and through resistor R18 to terminal SB14 and the emitter is connected to terminal SB9 (GND). Sensor power terminal T13 is connected to the input terminal of power source circuit 301 of which the output terminal is connected to terminal SB4 and through resistor R19 to terminal SB3. The anode of stability display light D5 is connected to the output terminal of the power source circuit 301 and its cathode is connected through resistor R20 to terminal SB13. The anode of indicator light D6 is connected to the output terminal of the power source circuit 301 and its cathode is connected to terminal SB8. The input terminal of IC 302 is connected to terminal SB10 and its PNP output terminal and NPN output terminal are connected through switch SW to control output terminal T14. The IC 302 is provided with a terminal to be connected to sensor power terminal T13 and terminal SB9. Transistor TR8 has its collector connected to terminal SB2, its base connected to terminal SB1 and its emitter connected through resistor R21 to terminal SB9 (GND). Capacitor C6 is connected between terminals SB6 and SB9. Terminals SB7 and SB11 are connected through resistor R22 to terminal SB9 and ground (GND) terminal T15. Terminal SB5 is not connected. The photoelectric sensor which is formed with the distance-settable type module 30 and the output circuit assembly 30b is provided with the BGS/FGS switching function, the timer setting function, the light ON/dark ON switching function, the function for adjusting the sensitivity of received light quantity and the function of adjusting light-emitting current. The BGS/FGS switching function is effected by changing the voltage level at terminal SB15. The BGS function is effected by setting the voltage at terminal SB15 to the ground level and the FGS function is effected by setting the voltage at terminal SB15 to the level of the IC internal stability voltage (Vref). The timer setting function is effected by varying the value of the capacitor C6 such that the off-delay timing is changed.

FIG. 22 is a circuit diagram of an output circuit assembly 30c to be connected to the detection circuit assembly 35 for employing only a portion of the functions of the distance-setting type module 30. Since this output circuit assembly 30c is structured basically in the same way as the output circuit assembly 30b of the type that uses all of the functions of the distance-setting type module 30, only the difference will be described below. Light ON/dark ON switching terminal T11 is connected through resistor R15 to the base of transistor TR6 of which the collector is connected to terminal SB12 and through resistor R16 to terminals SB14 and SB15 and the emitter is connected to terminal SB9 (GND). The output circuit assembly 30d does not use the BGS/FGS switching function and the timer setting function and its terminals SB5 and SB6 are not connected. The photoelectric sensor formed with the distance-settable type module 30 and the output circuit assembly 30c has the light ON/dark ON switching function, the function for adjusting the sensitivity to the quantity of received light and the function for adjusting the light-emitting current.

As explained above with examples, photoelectric sensors having different functions can be provided by combining output circuit assemblies of different types with a detection terminal module of this invention. Since an optical assembly and a detection circuit assembly are structured in the form of a module, many cases of different shapes can be used. Thus, the number of components and the cost of production can be reduced while a rich variety of components can be accommodated.

Although the invention was described above as applied to photoelectric sensors of the diffuse reflective type, the recursion reflective type, the distance-settable type and the transmissive type, it goes without saying that the present invention is applicable to photoelectric sensors of other types.

What is claimed is:

1. A detection terminal module for a photoelectric sensor, said detection terminal module comprising:
   an optical assembly including a lens and a holder which holds said lens; and
   a detection circuit assembly which is integrally formed with said optical assembly and includes an integrated circuit and terminals connected to said integrated circuit;
   wherein said integrated circuit includes:
   a detection circuit for detecting presence or absence of a target object of detection for said photoelectric sensor from a light-reception signal obtained by converting light received through said lens into an electrical signal by a light receiving element,
   a self-analysis circuit for judging the signal level of said light-reception signal by comparing the signal level of said light-reception signal with a specified threshold value, and
   a judging circuit for judging presence or absence of light entering said light receiving element or operating condition of said photoelectric sensor inclusive of result of judging by said self-analysis circuit;
   said terminals including:
   a control output terminal for transmitting outputs of said detection circuit,
   a stability display terminal for transmitting outputs of said self-analysis circuit,
   an indicator terminal for transmitting outputs of said judging circuit,
   a sensor power source terminal for supplying power for said integrated circuit, and
   a GND terminal for keeping said integrated circuit at the zero voltage level;
   wherein said module serves to form sensor products of different kinds by connecting electrically through said terminal to an output circuit provided external to said detection circuit assembly.

2. The detection terminal module of claim 1 wherein said integrated circuit further includes a selection circuit for selecting whether said self-diagnosis circuit is activated or not based on an input of an external selection signal; and
   wherein said terminals further include:
   a self-diagnosis selection terminal for transmitting said selection signal, and
   a self-diagnosis output terminal for transmitting outputs of said self-diagnosis circuit.

3. The detection terminal module of claim 1 wherein said integrated circuit further includes:
   a timer setting circuit for setting a specified timer timing based on an input of an external signal, and
   a power source circuit for supplying a stabilization power source for internal circuits based on power supplied from outside; and
   wherein said detection circuit assembly further includes:
   a timer setting terminal for transmitting from outside a selection signal for selecting whether said timer setting circuit is activated or not, and
   an internal power source terminal for supplying said stabilization power source.

4. The detection terminal module of claim 1 wherein said integrated circuit further includes a light ON/dark ON switching circuit for switching between a light ON operation and a dark ON operation based on an input of an external signal, said light ON operation being wherein said photoelectric sensor makes a detection output when light is received thereby, said dark ON operation being wherein said photoelectric sensor makes a detection output when light is screened therefrom; and
   wherein said detection circuit assembly further includes a light ON/dark ON switching terminal for transmitting from outside a signal that indicates whether said light ON operation or said dark ON operation is selected.

5. The detection terminal module of claim 1 wherein said integrated circuit further includes:
   a main amplifier circuit for adjusting sensitivity to the quantity of received light based on an input from outside, and
   a preamplifier circuit for outputting the quantity of received light; and
   wherein said detection circuit assembly further includes:
   an main amplifier input terminal for transmitting an input signal to said main amplifier circuit, and
   a preamplifier output terminal for transmitting outputs from said preamplifier circuit.

6. The detection terminal module of claim 1 wherein said optical assembly further includes a light emitting element, said integrated circuit further includes an emission stopping circuit for stopping driving said light emitting element based on an input of an external signal and said detection circuit assembly further includes an external diagnosis input terminal for transmitting a signal that indicates whether said emission stopping circuit is activated or not.

7. The detection terminal module of claim 1 wherein said optical assembly further includes a light emitting element, said integrated circuit further includes a current adjusting circuit for adjusting a light-emitting current that flows through said light emitting element based on an input of an external signal and said detecting circuit assembly further includes a current adjusting terminal for transmitting a signal that indicates whether said current adjusting circuit is activated or not.

8. The detection terminal module of claim 1 wherein said lens includes a light emitting lens and a light-receiving lens.

9. The detection terminal module of claim 1 wherein said lens includes a light-receiving lens.

10. A photoelectric sensor comprising:
a detection terminal module having an optical assembly including a lens and a holder which holds said lens and a detection circuit assembly which is integrally formed with said optical assembly and includes an integrated circuit and terminals connected to said integrated circuit;
an output terminal module having an output circuit incorporated therein; and
a case that holds said detection terminal module and said output terminal module;
wherein said integrated circuit includes:
a detection circuit for detecting presence or absence of a target object of detection for said photoelectric sensor from a light-reception signal obtained by converting light received through said lens into an electrical signal by a light receiving element,
a self-analysis circuit for judging the signal level of said light-reception signal by comparing the signal level of said light-reception signal with a specified threshold value, and
a judging circuit for judging presence or absence of light entering said light receiving element or operating condition of said photoelectric sensor inclusive of result of judging by said self-analysis circuit;
said terminals including:
a control output terminal for transmitting outputs of said detection circuit,
a stability display terminal for transmitting outputs of said self-analysis circuit,
an indicator terminal for transmitting outputs of said judging circuit,
a sensor power source terminal for supplying power for said integrated circuit, and
a GND terminal for keeping said integrated circuit at the zero voltage level;
wherein said output terminal module includes:
an output circuit for outputting an object detecting signal indicative of detection of an object to outside said photoelectric sensor based on a signal from said control output terminal,
a first driver circuit for driving a stability displaying first light emitting element based on a signal from said stability display terminal, and
a second driver circuit for driving an indicator second light emitting element based on a signal from said indicator terminal;
wherein said detection terminal module and said output terminal module are electrically connected at least through said control output terminal, said stability display terminal, said indicator terminal, said sensor power source terminal and said GND terminal.

11. The photoelectric sensor of claim 10 wherein said integrated circuit further includes a selection circuit for selecting whether said self-diagnosis circuit is activated or not based on an input of an external selection signal;
wherein said terminals further include:
a self-diagnosis selection terminal for transmitting said selection signal, and
a self-diagnosis output terminal for transmitting outputs of said self-diagnosis circuit when said self-diagnosis circuit is selected to be activated;
wherein said output terminal module further includes a judgment result outputting circuit for outputting judgment result inputted from said self-diagnosis output terminal;
wherein said detection terminal module and said output terminal module are electrically connected also through said self-diagnosis selection terminal and said self-diagnosis output terminal; and
wherein an output from said self-diagnosis circuit is transmitted when a self-diagnosis execution signal is inputted to said self-diagnosis selection terminal.

12. The photoelectric sensor of claim 10 wherein said integrated circuit further includes:
a timer setting circuit for setting a specified timer timing based on an input of an external signal, and
a power source circuit for supplying a stabilization power source for internal circuits based on power supplied; and
wherein said detection circuit assembly further includes:
a timer setting terminal for transmitting a selection signal for selecting whether said timer setting circuit is activated or not, and
an internal power source terminal for supplying said stabilization power source;
wherein said detection terminal module and said output terminal module are electrically connected also through said timer setting terminal and said internal power source terminal; and
wherein said timer timing is set by said timer setting circuit when a timer setting signal is transmitted through said timer setting terminal.

13. The photoelectric sensor of claim 10 wherein said integrated circuit further includes a light ON/dark ON switching circuit for switching between a light ON operation and a dark ON operation based on an input of an external signal, said light ON operation being wherein said photoelectric sensor makes a detection output when light is received thereby, said dark ON operation being wherein said photoelectric sensor makes a detection output when light is screened therefrom;
wherein said detection circuit assembly further includes a light ON/dark ON switching terminal for transmitting from outside a signal that indicates whether said light ON operation or said dark ON operation is selected;
wherein said detection terminal module and said output terminal module are electrically connected also through said light ON/dark ON switching terminal; and
wherein a control for switching between said light ON operation and said dark ON operation is carried out by said light ON/dark ON switching circuit when a switching signal is transmitted to said light ON/dark ON switching terminal.

14. The photoelectric sensor of claim 10 wherein said integrated circuit further includes a main amplifier circuit for adjusting sensitivity against the quantity of received light based on an input from outside, and
a preamplifier circuit for outputting the quantity of received light; and
wherein said detection circuit assembly further includes:
an main amplifier input terminal for transmitting an input signal to said main amplifier circuit, a preamplifier output terminal for transmitting outputs from said preamplifier circuit;

wherein said output terminal module further includes a sensitivity adjusting circuit for adjusting sensitivity to quantity of received light based on outputs from said preamplifier circuit;

wherein said detection terminal module and said output terminal module are electrically connected also through said main amplifier input terminal and said preamplifier output terminal; and wherein said photoelectric sensor adjusts sensitivity to quantity of received light by operations of said sensitivity adjusting circuit.

15. The photoelectric sensor of claim 10 wherein said optical assembly further includes a light emitting element, said integrated circuit further includes an emission stopping circuit for stopping driving said light emitting element based on an input of an external signal;

wherein said detection circuit assembly further includes an external diagnosis input terminal for transmitting a signal that indicates whether said emission stopping circuit is activated or not;

wherein said detection terminal module and said output terminal module are electrically connected also through said external diagnosis input terminal; and wherein said photoelectric sensor carries out external diagnosis function by stopping light emission by said emission stopping circuit when an external diagnosis signal is transmitted to said external diagnosis input terminal.

16. The photoelectric sensor of claim 10 wherein said optical assembly further includes a light emitting element, said integrated circuit further includes a current adjusting circuit for adjusting a light-emitting current that flows through said light emitting element based on an input of an external signal;

wherein said detecting circuit assembly further includes a current adjusting terminal for transmitting a signal that indicates whether said current adjusting circuit is activated or not;

wherein said detection terminal module and said output terminal module are electrically connected also through said current adjusting terminal; and wherein said photoelectric sensor adjusts said light-emitting current by said current adjusting circuit when a light-emitting current adjusting signal is transmitted to said current adjusting terminal.

17. The photoelectric sensor of claim 10 which is structured as any of the group of sensors consisting of a recursion reflective photoelectric sensor, a distance-settable photoelectric sensor and a transmissive photoelectric sensor.

* * * * *